(12) United States Patent
Kim et al.

(10) Patent No.: US 9,224,530 B2
(45) Date of Patent: Dec. 29, 2015

(54) POWER SUPPLY APPARATUS

(71) Applicants: LG Innotek Co., Ltd., Seoul (KR);
JEONJU UNIVERSITY OFFICE OF INDUSTRY-UNIVERSITY COOPERATION, Jeonju (KR)

(72) Inventors: Eun Soo Kim, Seoul (KR); Jun Ho Park, Seoul (KR)

(73) Assignees: LG Innotek Co., Ltd., Seoul (KR);
Jeonju University Office of Industry-University Cooperation, Jeonju (KR)

( * ) Notice: Subject to any disclaimer, the term of this patent is extended or adjusted under 35 U.S.C. 154(b) by 0 days.

(21) Appl. No.: 14/023,212

(22) Filed: Sep. 10, 2013

(65) Prior Publication Data
US 2014/0085035 A1    Mar. 27, 2014

Related U.S. Application Data

(63) Continuation of application No. 13/547,992, filed on Jul. 12, 2012, now abandoned.

(30) Foreign Application Priority Data

Aug. 4, 2011   (KR) .................. 10-2011-0077639

(51) Int. Cl.
*H01F 27/24*    (2006.01)
*H01F 27/28*    (2006.01)
(Continued)

(52) U.S. Cl.
CPC ............... *H01F 27/24* (2013.01); *H01F 27/38* (2013.01); *H01F 3/14* (2013.01); *H01F 2003/106* (2013.01); *H02M 1/4225* (2013.01); *H02M 3/33523* (2013.01); *H02M 2001/007* (2013.01); *H02M 2003/1586* (2013.01); *Y02B 70/126* (2013.01)

(58) Field of Classification Search
CPC .......... H01F 3/08; H01F 3/10; H01F 17/043; H01F 17/06; H01F 17/062; H01F 27/255; H01F 27/26; H01F 27/24; H01F 27/38; H01F 3/14; H01F 17/04; H01F 2003/106; H02M 1/4225; H02M 3/33523; H02M 2001/007; H02M 2003/1586; Y02B 70/126
USPC .................................. 336/212, 233, 184, 182
See application file for complete search history.

(56) References Cited

U.S. PATENT DOCUMENTS 3,631,534 A * 12/1971 Hirota et al. ................... 336/155
3,686,561 A *  8/1972 Spreadbury ................... 323/308
(Continued)

FOREIGN PATENT DOCUMENTS

CN        1577882 A      2/2005
CN      101197205 A      6/2008
(Continued)

*Primary Examiner* — Mangtin Lian
(74) *Attorney, Agent, or Firm* — Birch, Stewart, Kolasch & Birch, LLP

(57) ABSTRACT

A power supply apparatus including a first magnetic core, a second magnetic core having a shape symmetrical to a shape of the first magnetic core, a third magnetic core between the first and second magnetic cores, a first coil wound around at least one of the first and third magnetic cores, and a second coil wound around at least one of the second and third magnetic cores, wherein a material for the third magnetic core is different from a material for the first magnetic core or the second magnetic core.

6 Claims, 23 Drawing Sheets

(51) Int. Cl.
*H01F 27/38* (2006.01)
*H02M 1/42* (2007.01)
*H02M 3/335* (2006.01)
*H02M 1/00* (2007.01)
*H02M 3/158* (2006.01)
*H01F 3/14* (2006.01)
*H01F 3/10* (2006.01)

(56) References Cited

U.S. PATENT DOCUMENTS

| | | | |
|---|---|---|---|
| 5,335,163 A * | 8/1994 | Seiersen | 363/126 |
| 5,889,373 A | 3/1999 | Fisher et al. | |
| 6,642,672 B2 * | 11/2003 | Hu et al. | 315/276 |
| 6,867,564 B1 | 3/2005 | Wu et al. | |
| 2005/0012583 A1 | 1/2005 | Sutardja | |
| 2007/0247270 A1 * | 10/2007 | Fushimi et al. | 336/212 |
| 2010/0254168 A1 * | 10/2010 | Chandrasekaran | 363/37 |
| 2010/0271164 A1 * | 10/2010 | Kitajima et al. | 336/221 |
| 2011/0080246 A1 * | 4/2011 | Chen et al. | 336/212 |

FOREIGN PATENT DOCUMENTS

| | | |
|---|---|---|
| CN | 101640101 A | 2/2010 |
| JP | 11-273955 A | 10/1999 |
| JP | 2002-359122 A | 12/2002 |
| JP | 2004-260183 A | 9/2004 |

\* cited by examiner

US 9,224,530 B2

POWER SUPPLY APPARATUS

CROSS-REFERENCE TO RELATED APPLICATIONS

The present application is a continuation of application Ser. No. 13/547,992, filed Jul. 12, 2012, which claims priority under 35 U.S.C. 119 to Korean Patent Application No. 10-2011-0077639, filed Aug. 4, 2011, which are hereby incorporated by reference in their entirety.

BACKGROUND

Recently, electronic products have various functions and superior performance and have tended toward the small-size and light-weight. In order to realize the electronic products having the small-size and light-weight, the size or volume of parts installed in the electronic products must be reduced.

In particular, as the semiconductor integrated circuits have been developed, circuits can be prepared with the small-size and light weight. However, there is a problem to reduce the volume of an inductor installed in the electronic products. In this regard, studies and research have been continuously performed to reduce the size and the weight of the inductor installed in the electronic product.

Meanwhile, a PFC (Power Factor Correction) converter, which is an input power factor correction circuit, has been extensively used for a power supply apparatus of the electronic product in response to the demand for reducing harmonics and correcting input power factor in commercial power.

In addition, in order to reduce the ripple of input current Iin and to improve the efficiency of the PFC converter, an interleaved PFC converter (or interleaved boost converter) employing two individual inductors has been used.

To this end, according to the related art, an air gap is essentially required in an intermediate magnetic path or a lateral magnetic path of a core to manufacture a couple inductor. However, in order to form the air gap, an additional cutting work is necessary, so the manufacturing cost may be increased and the management for the air gap may be difficult.

SUMMARY

The embodiment provides a power supply apparatus including an inductor, a transformer and an inductor-transformer having the novel structure.

Technical objects of the embodiment may not be limited to the above object and other technical objects of the embodiment will be apparent to those skilled in the art from the following description.

A power supply apparatus according to the embodiment includes a first magnetic core; a second magnetic core having a shape equal to a shape of the first magnetic core; a third magnetic core between the first and second magnetic cores; a first coil wound around one of the first and third magnetic cores; and a second coil wound around one of the second and third magnetic cores.

DETAILED DESCRIPTION OF THE EMBODIMENTS

Figure 1A:
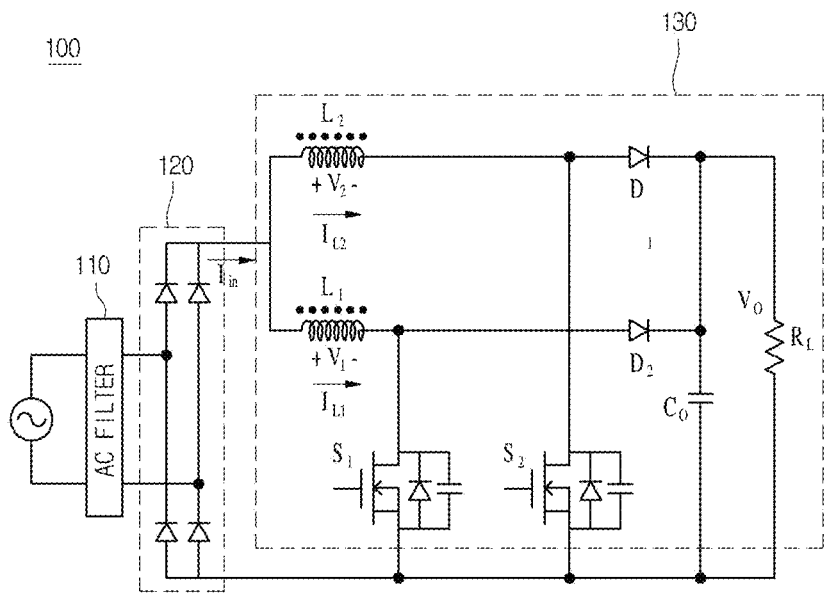
FIGS. 1a and 1b are circuit views showing a power supply apparatus including a couple inductor according to the embodiment.

Hereinafter, the embodiments will be described with reference to accompanying drawings in detail so that those skilled in the art to which the invention pertains can easily realize the embodiments. However, the embodiments may have various modifications without limitation.

In the following description, when a part is referred to as it includes a component, the part may not exclude other components but further include another component unless the context indicates otherwise.

The thickness and size of each layer shown in the drawings may be exaggerated, omitted or schematically drawn for the purpose of convenience or clarity. In addition, the size of elements does not utterly reflect an actual size. In the following description, the similar components will be assigned with the similar reference numerals throughout the specification.

Figure 1B:
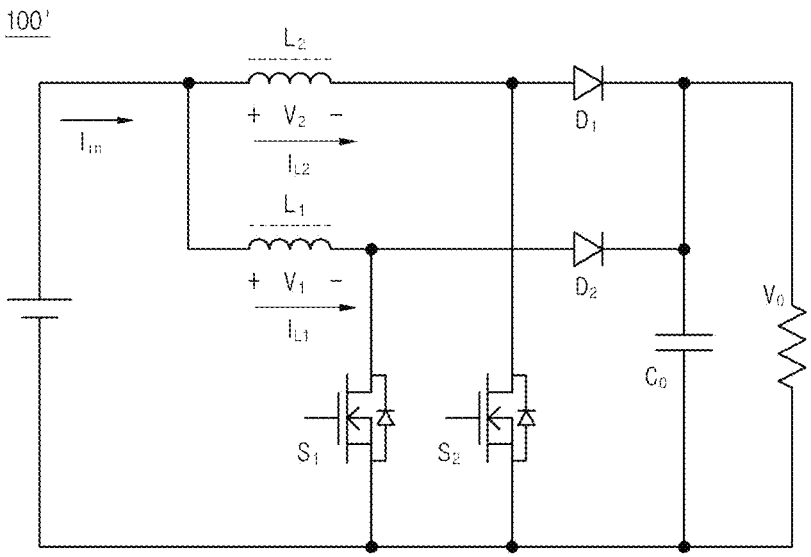

FIGS. 1a and 1b are circuit views showing a power supply apparatus including a couple inductor according to the embodiment;

As shown in FIG. 1a, the power supply apparatus 100 including the inductor may include a filter 110, a rectifying unit 120 and a power factor correction unit 130.

The filter 110 is provided at an input side to which commercial power (85V to 260V) is input in order to reduce conductive noise.

To this end, the filter 110 may include coils provided at a pair of power lines, respectively, and a capacitor connected to the power lines in parallel at both ends of the coils. The coils may be common mode chock coils and two windings are provided per one core at in-phase.

The rectifying unit 120 is connected to an output side of the filter 110 to rectify the wave of the commercial power. The rectifying unit 120 is a bridge diode BD including a plurality of diodes.

The power factor correction unit 130 charges/discharges the energy accumulated in inductors L1 and L2 through the operation of semiconductor switches S1 and S2 to make input voltage and current in-phase.

The power factor correction unit 130 includes a first inductor L1, a second inductor L2, a first semiconductor switch S1 for switching the charge/discharge operation of the first inductor L1, a second semiconductor switch S2 for switching the charge/discharge operation of the second inductor L2, a first diode D1 connected to the first inductor L1, a second diode D2 connected to the second inductor L2 and an output condenser Co. Reference numeral $R_L$ represents resistance.

Meanwhile, the power supply apparatus according to the embodiment is applicable not only for AC input power as shown in FIG. 1a, but also for DC input power as shown in FIG. 1b.

FIG. 1b is a view showing a power supply apparatus 100' according to another embodiment. The power supply apparatus 100' may be a DC/DC converter.

The power supply apparatus 100' shown in FIG. 1b includes the power factor correction unit having the structure the same as that of the power factor correction unit 130 included in the power supply apparatus 100 shown in FIG. 1a, so the detailed description thereof will be omitted.

Hereinafter, the structure of the couple inductor including the first and second inductors L1 and L2 will be described.

The couple inductor according to the embodiment may include a core having the shape of U, I, U or I, H, I. Although an air gap can be separately prepared, a gap sheet or a core having low permeability (powder core) is employed to form the air gap, instead of cutting a magnetic path to form the air gap, thereby reducing the cost required for the cutting process.

In addition, the above structure of the couple inductor can be used for the structure of a couple transformer and the structure of a couple inductor-transformer in which the inductor is integrated with the transformer.

Figure 2A:
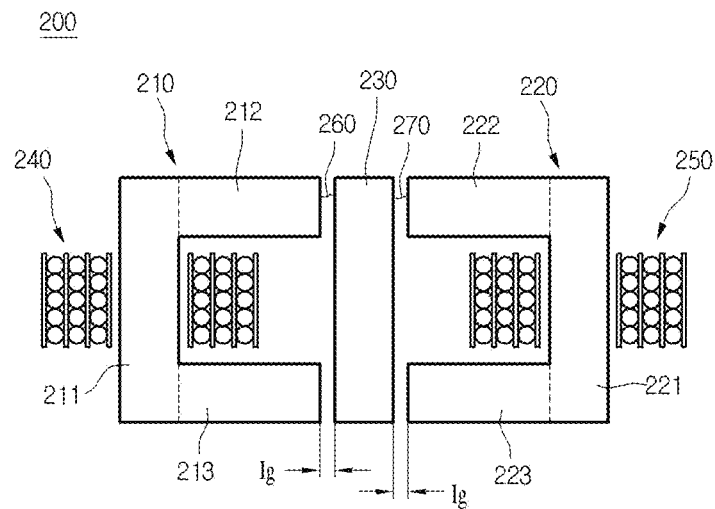
FIGS. 2a to 18 are views showing a couple inductor according to the embodiment.

FIG. 2a is a view showing a couple inductor according to the first embodiment.

Referring to FIG. 2a, the couple inductor 200 includes a first magnetic core 210, a second magnetic core 220, a third magnetic core 230, a first coil 240 wound around the first magnetic core 210, and a second coil 250 wound around the second magnetic core 220.

The first magnetic core 210 has a shape of 'U'.

In addition, the second magnetic core 220 also has a shape of 'U'. In this case, the first magnetic core 210 is arranged in the shape of 'U' and the second magnetic core 220 is arranged symmetrically to the first magnetic core 210 while interposing the third magnetic core 230 therebetween.

In detail, the first magnetic core 210 includes a first core part 211 having a shape of 'I', a second core part 212 extending from one end of the first core part 211 (an upper end of the first core part in the drawing) vertically to the length direction of the first core part 211, and a third core part 213 extending from the other end of the first core part 211 (a lower end of the first core part in the drawing) vertically to the length direction of the first core part 211.

Similarly, the second magnetic core 220 includes a first core part 221 having a shape of 'I', a second core part 222 extending from one end of the first core part 221 (an upper end of the first core part in the drawing) vertically to the length direction of the first core part 221, and a third core part 223 extending from the other end of the first core part 221 (a lower end of the first core part in the drawing) vertically to the length direction of the first core part 221.

The third magnetic core 220 has a shape of 'I' and is interposed between the first and second magnetic cores 210 and 220.

In addition, the couple inductor 200 according to the first embodiment includes the first coil 240 wound around the first magnetic core 210 and the second coil 250 wound around the second magnetic core 220.

In detail, the first coil 240 is wound around the first core part 211 of the first magnetic core 210. At this time, the first coil 240 is wound around the center portion of the first core part 211 of the first magnetic core 210 several times.

In addition, the second coil 250 is wound around the first core part 221 of the second magnetic core 220. At this time, the second coil 250 is wound around the center portion of the first core part 221 of the second magnetic core 220 several times.

Meanwhile, the first coil 240 can be wound lengthwise along the first magnetic core 210. Preferably, as shown in FIG. 2a, the first coil 240 can be wound lengthwise along the first core part 211 of the first magnetic core 210.

In the same manner, the second coil 250 can be wound lengthwise along the second magnetic core 220. Preferably, as shown in FIG. 2a, the second coil 250 can be wound lengthwise along the first core part 221 of the second magnetic core 220.

At this time, a first air gap (Ig) 260 is formed between the first and third magnetic cores 210 and 230 and a second air gap (Ig) 270 is formed between the second and third magnetic cores 220 and 230.

A top surface of the second core part 212 of the first magnetic core 210 is aligned on the same plane with a top surface of the third magnetic core 230. In addition, a bottom surface of the third core part 213 of the first magnetic core 210 is aligned on the same plane with a bottom surface of the third magnetic core 230.

As a result, the first air gap 260 is formed between the right lateral side of the second core part 212 of the first magnetic core 210 and the left lateral side of the third magnetic core 230. In addition, the first air gap 260 is formed between the right lateral side of the third core part 213 of the first magnetic core 210 and the left lateral side of the third magnetic core 230. According to the first embodiment, the first air gap 260 may be formed between right lateral sides of the second and third core parts 212 and 213 of the first magnetic core 210 and the left lateral side of the third magnetic core 230, respectively.

In the same manner, a top surface of the second core part 222 of the second magnetic core 220 is aligned on the same plane with a top surface of the third magnetic core 230. In addition, a bottom surface of the third core part 223 of the second magnetic core 220 is aligned on the same plane with a bottom surface of the third magnetic core 230.

As a result, the second air gap 270 is formed between the left lateral side of the second core part 222 of the second magnetic core 220 and the right lateral side of the third magnetic core 230. In addition, the second air gap 270 is formed between the left lateral side of the third core part 223 of the second magnetic core 220 and the right lateral side of the third magnetic core 230. According to the first embodiment, the second air gap 270 may be formed between left lateral sides of the second and third core parts 222 and 223 of the second magnetic core 220 and the right lateral side of the third magnetic core 230, respectively.

In detail, according to the first embodiment, the couple inductor 200 including two inductors is prepared as an integrated couple inductor by winding coils around the core. Although it is possible to form the air gap through the conventional cutting process, according to the embodiment, the air gap is simply formed by employing a gap sheet or a bottom without performing the cutting process when manufacturing the couple inductor.

Figure 2B:
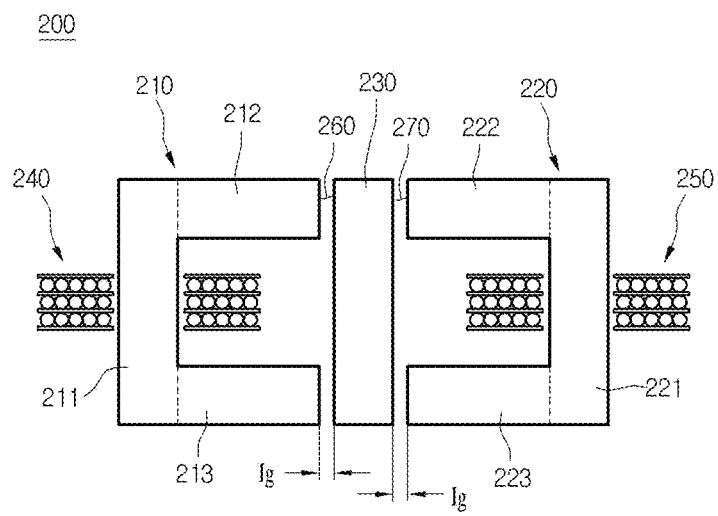

Meanwhile, as shown in FIG. 2b, the winding scheme for the first and second coils 240 and 250 of the couple inductor 200 may be different from the winding scheme shown in FIG. 2a.

That is, as shown in FIG. 2b, the first coil 240 may be wound around the first magnetic core 210 in the direction crossing the length direction of the first magnetic core 210, which is different from FIG. 2a. Preferably, as shown in FIG. 2b, the first coil 240 can be wound around the first core part 211 of the first magnetic core 210 in the direction crossing the length direction of the first core part 211 of the first magnetic core 210.

In the same manner, the second coil 250 may be wound around the second magnetic core 220 in the direction crossing the length direction of the second magnetic core 220. Preferably, as shown in FIG. 2b, the second coil 250 can be wound around the first core part 221 of the second magnetic core 220 in the direction crossing the length direction of the first core part 221 of the second magnetic core 220.

Figure 2C:
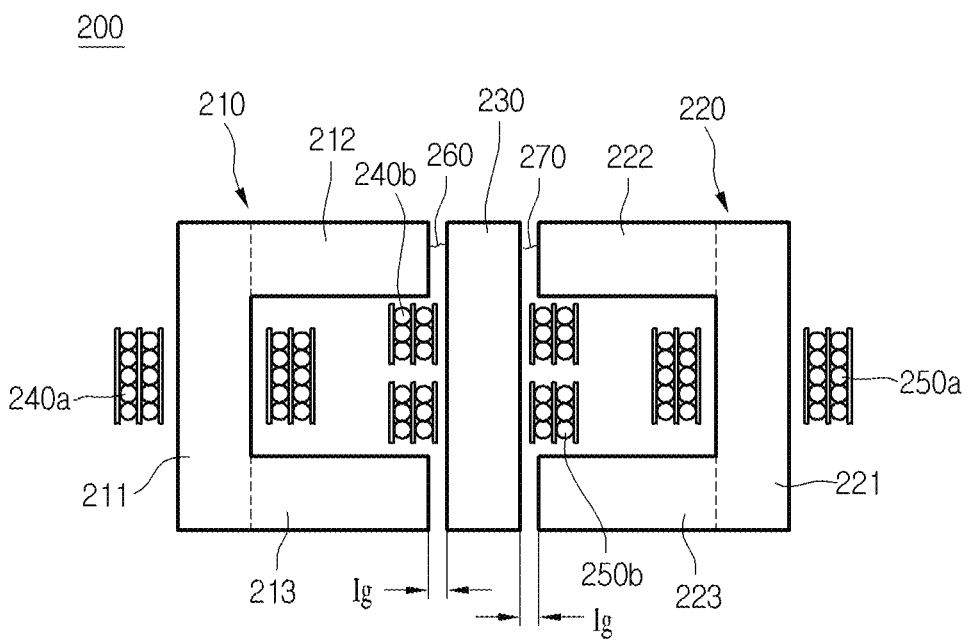

Meanwhile, as shown in FIG. 2c, the first coil 240 of the couple inductor 200 may include a primary coil 240a wound around the first core part 211 of the first magnetic core 210 and a secondary coil 240b wound around the third magnetic core 230 while being connected to the primary coil 240a in series.

In addition, the second coil 250 of the couple inductor 200 may include a tertiary coil 250a wound around the first core part 221 of the second magnetic core 220 and a quaternary coil 250b wound around the third magnetic core 230 while being connected to the tertiary coil 250a in series.

Figure 3A:
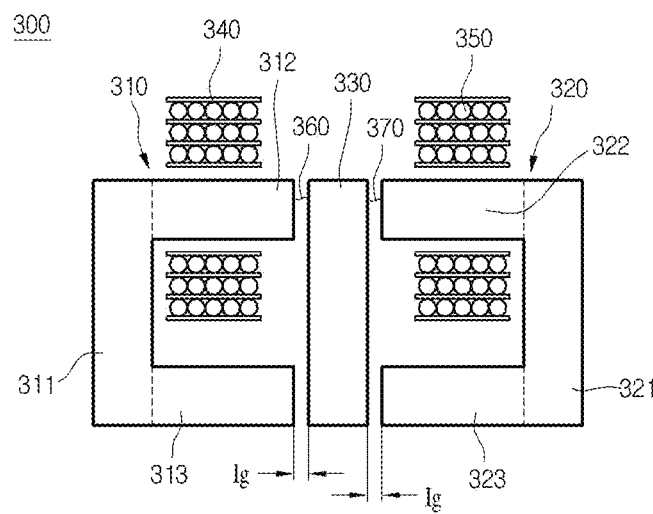

FIG. 3a is a view showing a couple inductor according to the second embodiment.

Referring to FIG. 3a, the couple inductor 300 includes a first magnetic core 310, a second magnetic core 320, a third magnetic core 330, a first coil 340 wound around the first magnetic core 310, and a second coil 350 wound around the second magnetic core 320.

The first magnetic core 310 has a shape of 'U'.

In addition, the second magnetic core 320 also has a shape of 'U'. In this case, the first magnetic core 310 is arranged in the shape of 'U' and the second magnetic core 320 is arranged symmetrically to the first magnetic core 310 while interposing the third magnetic core 330 therebetween.

In detail, the first magnetic core 310 includes a first core part 311 having a shape of 'I', a second core part 312 extending from one end of the first core part 311 (an upper end of the first core part in the drawing) vertically to the length direction of the first core part 311, and a third core part 313 extending from the other end of the first core part 311 (a lower end of the first core part in the drawing) vertically to the length direction of the first core part 311.

Similarly, the second magnetic core 320 includes a first core part 321 having a shape of 'I', a second core part 322 extending from one end of the first core part 321 (an upper end of the first core part in the drawing) vertically to the length direction of the first core part 321, and a third core part 323 extending from the other end of the first core part 321 (a lower end of the first core part in the drawing) vertically to the length direction of the first core part 321.

The third magnetic core 320 has a shape of 'I' and is interposed between the first and second magnetic cores 310 and 320.

In addition, the couple inductor 300 according to the second embodiment includes the first coil 340 wound around the first magnetic core 310 and the second coil 350 wound around the second magnetic core 320.

In detail, the first coil 340 is wound around the second core part 312 of the first magnetic core 310. At this time, the first coil 340 is wound around the center portion of the second core part 312 of the first magnetic core 310 several times.

In addition, the second coil 350 is wound around the second core part 322 of the second magnetic core 320. At this time, the second coil 350 is wound around the center portion of the second core part 322 of the second magnetic core 320 several times.

At this time, a first air gap (Ig) 360 is formed between the first and third magnetic cores 310 and 330 and a second air gap (Ig) 370 is formed between the second and third magnetic cores 320 and 330.

That is, according to the first embodiment, the coils 240 and 250 are wound around the first core parts 211 and 221 of the first and second magnetic cores 210 and 220, and, according to the second embodiment, the coils 340 and 350 are wound around the second core parts 312 and 322 of the first and second magnetic cores 310 and 320.

Figure 3B:
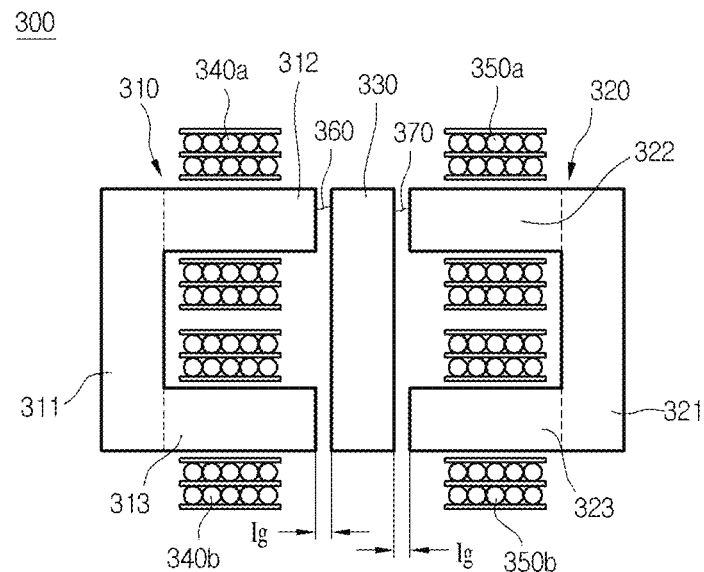

Meanwhile, as shown in FIG. 3b, the first coil 340 of the couple inductor 300 may include a primary coil 340a wound around the second core part 312 of the first magnetic core 310 and a secondary coil 340b wound around a third core part 313 of the first magnetic core 310 while being connected to the primary coil 340a in series.

In addition, the second coil 350 of the couple inductor 300 may include a tertiary coil 350a wound around the second core part 332 of the second magnetic core 320 and a quaternary coil 350b wound around a third core part 323 of the second magnetic core 320 while being connected to the tertiary coil 350a in series.

Figure 4:
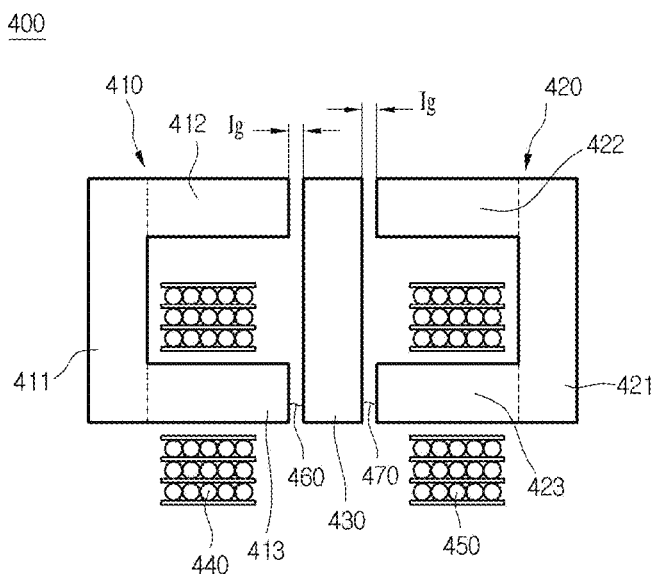

FIG. 4 is a view showing a couple inductor according to the third embodiment.

Referring to FIG. 4, the couple inductor 300 according to the third embodiment includes a first magnetic core 410, a second magnetic core 420, a third magnetic core 430, a first air gap 460 and a second air gap 470, which have the structure the same as that of the first embodiment.

According to the couple inductor 200 of the first embodiment, the coils are wound around the first core parts of the first and second magnetic cores, and, according to the second embodiment, the coils are wound around the second core parts of the first and second magnetic cores.

However, according to the third embodiment, a first coil 440 is wound around a third core part 413 of the first magnetic core 410 and a second coil 450 is wound around a third core part 423 of the second magnetic core 420.

At this time, the first magnetic cores 210, 310 and 410, the second magnetic cores 220, 320 and 420, and the third magnetic cores 230, 330 and 430 according to the first to third embodiments may include ferrite cores having the magnetic property of high permeability.

Figure 5:
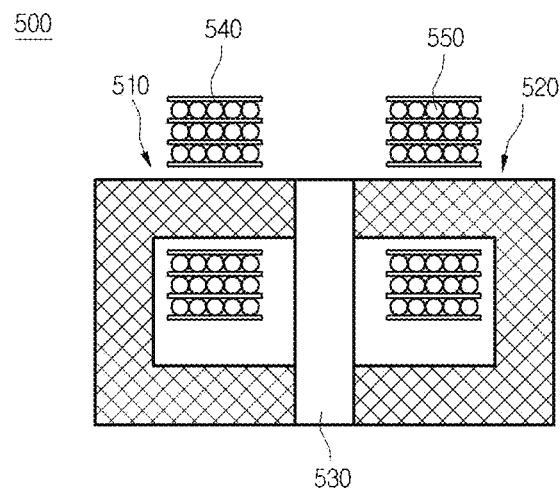

FIG. 5 is a view showing a couple inductor according to the fourth embodiment.

Referring to FIG. 5, the couple inductor 500 includes a first magnetic core 510 having a shape of 'U', a second magnetic core 520 having a shape the same as that of the first magnetic core 510 and disposed symmetrically to the first magnetic core 510, and a third magnetic core 530 having a shape of 'I' and disposed between the first and second magnetic cores 510 and 520.

In addition, the couple inductor 500 includes a first coil 540 wound around the first magnetic core 510 and a second coil 550 wound around the second magnetic core 520.

Although it is illustrated that the first coil 540 is wound around the second core part of the first magnetic core 510 and the second coil 550 is wound around the second core part of the second coil 550, this is illustrative purpose only. For instance, as illustrated in the first and third embodiments, the first and second coils 540 and 550 can be wound around the first core parts or the third core parts of the first and second magnetic cores, respectively.

According to the fourth embodiment, different from the first to third embodiments, the air gap may not be formed between the first and third magnetic cores 510 and 530 and between the second and third cores 520 and 530.

To this end, according to the fourth embodiment, the first and second magnetic cores 510 and 520 are formed by using the same material and the third magnetic core 530 is formed by using the material different from the material for the first and second magnetic cores 510 and 520.

That is, the first and second magnetic cores 510 and 520 may include powder cores having low permeability and the third magnetic core 530 may include a ferrite core having high permeability.

In other words, the air gap is not formed in the couple inductor and the magnetic cores are prepared by using different magnetic materials, so the eddy current losses generated from the first and second coils 540 and 550 caused by the fringing flux can be reduced. In addition, since the couple inductor is fabricated without the air gap, the additional process, such as the cutting process, may be omitted.

Figure 6:
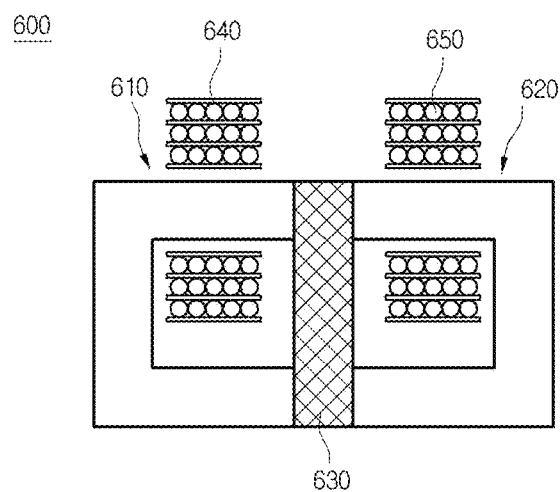

FIG. 6 is a view showing a couple inductor according to the fifth embodiment.

Referring to FIG. 6, the couple inductor 600 includes a first magnetic core 610, a second magnetic core 620, a third magnetic core 630, a first coil 640 and a second coil 650, which have the shapes identical to those of the couple inductor 500 according to the fourth embodiment.

Although the first and second magnetic cores 510 and 520 according to the fourth embodiment have the magnetic property of low permeability, the first and second magnetic cores 610 and 620 according to the fifth embodiment have the magnetic property of high permeability.

Therefore, contrary to the fourth embodiment, the third magnetic core 630 has the magnetic property of low permeability different from the first and second magnetic cores 610 and 620.

Figure 7:
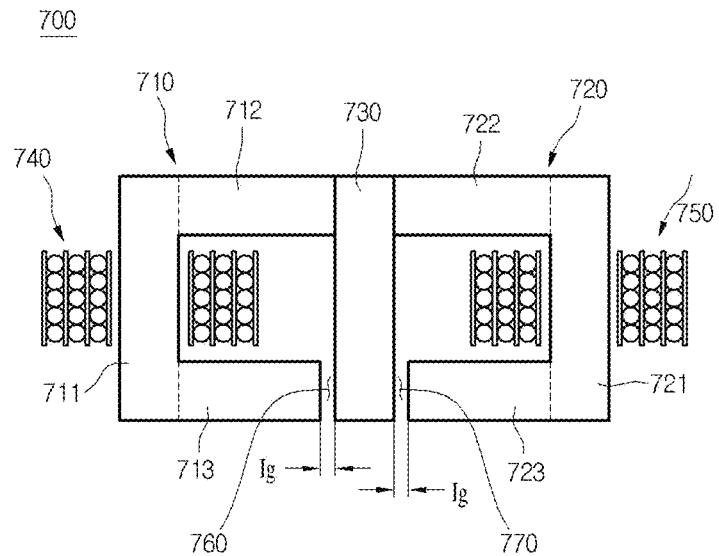

FIG. 7 is a view showing a couple inductor according to the sixth embodiment.

Referring to FIG. 7, the couple inductor 700 includes a first magnetic core 710, a second magnetic core 720, a third magnetic core 730, a first coil 740 and a second coil 750, which have the shapes identical to those of the couple inductor 300 according to the second embodiment.

According to the second embodiment, a plurality of first air gaps 360 are formed between the first and third magnetic cores 310 and 330 and a plurality of second air gaps 370 are formed between the second and third magnetic cores 320 and 330 due to the structures of the first to third magnetic cores 310, 320 and 330.

However, according to the sixth embodiment, one third air gap 760 is formed between the first and third magnetic cores 710 and 730 and one fourth air gap 770 is formed between the second and third magnetic cores 720 and 730.

To this end, one end of a third core part 713 of the first magnetic core 710 is cut such that the first magnetic core 710 can be spaced apart from the third magnetic core 730, thereby forming the third air gap 760. In addition, one end of a third core part 723 of the second magnetic core 720 is cut such that the second magnetic core 720 can be spaced apart from the third magnetic core 730.

At this time, since only one air gap is formed between the first and third magnetic cores 710 and 730 of the couple inductor 700 and only one air gap is formed between the second and third magnetic cores 720 and 730 of the couple inductor 700, the width of the third and fourth air gaps 760 and 770 is wider than the width of the first and second air gaps 360 and 370.

Thus, in the couple inductor 700, a second core part 712 of the first magnetic core 710 is longer than the third core part 713 and a second core part 722 of the second magnetic core 720 is longer than the third core part 723 of the second magnetic core 720.

In addition, the first coil 740 may be wound around the first core part 711 of the first magnetic core 710 and the second coil 750 may be wound around the first core part 721 of the second magnetic core 720.

Figure 8:
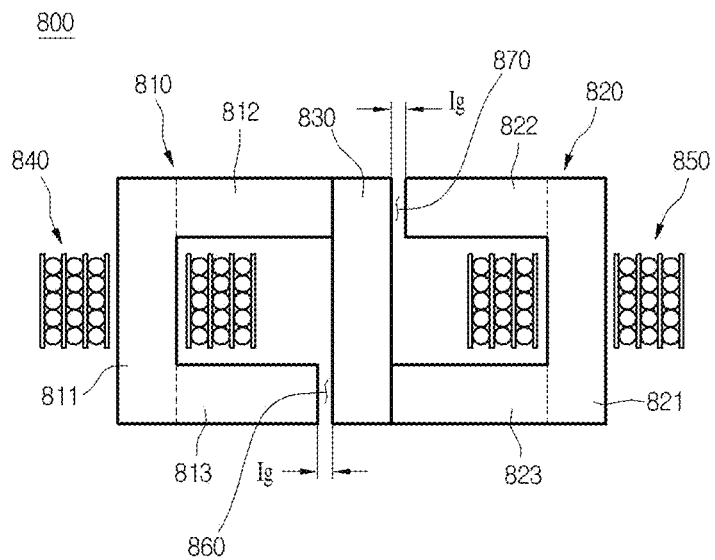

FIG. 8 is a view showing a couple inductor according to the seventh embodiment.

Referring to FIG. 8, the couple inductor 800 includes a first magnetic core 810, a second magnetic core 820, a third magnetic core 830, a first coil 840 and a second coil 850, which have the shapes identical to those of the couple inductor 700 according to the sixth embodiment.

According to the couple inductor 700 of the sixth embodiment, the fourth air gap 770 is formed between the third core part 723 of the second magnetic core 720 and the third magnetic core 730. However, according to the couple inductor 800 of the seventh embodiment, a fourth air gap 870 is formed between a second core part 822 of the second magnetic core 820 and the third magnetic core.

In other words, according to the couple inductor 700 of the sixth embodiment, the third and fourth air gaps 760 and 770 are formed at the bottom surface of the couple inductor 700 together. However, according to the couple inductor 800 of the seventh embodiment, third and fourth air gaps 860 and 870 are separately formed at the top and bottom surfaces of the couple inductor 800, respectively.

Thus, a third core part 823 of the second magnetic core 820 is longer than a second core part 822 of the second magnetic core 820 in the couple inductor 800 according to the seventh embodiment.

Figure 9A:
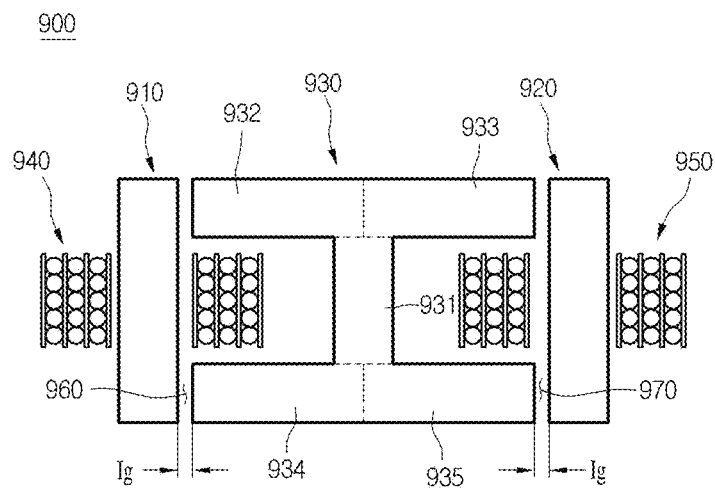

FIG. 9a is a view showing a couple inductor according to the eighth embodiment.

Referring to FIG. 9a, the couple inductor 900 includes a first magnetic core 910, a second magnetic core 920, a third magnetic core 930, a first coil 940, a second coil 950, a fifth air gap 960 and a sixth air gap 970.

The first and second magnetic cores 910 and 920 may have the same shape of 'I'.

The third magnetic core 930 is formed between the first and second magnetic cores 910 and 920. The third magnetic core 930 has a shape of 'H', which is different from the shape of the first and second magnetic cores 910 and 920.

In detail, the third magnetic core 930 includes a fourth core part 931 having a shape of 'I', a fifth core part 932 vertically extending from one end of the fourth core part 931 (an upper end of the fourth core part in the drawing) in the left direction with respect to the length direction of the fourth core part 931, a sixth core part 933 vertically extending from one end of the fourth core part 931 in the right direction, a seventh core part 934 vertically extending from the other end of the fourth core part 931 (a lower end of the fourth core part in the drawing) in the left direction, and an eighth core part 935 vertically extending from one end of the fourth core part 931 in the right direction.

At this time, the first and second magnetic cores 910 and 920 are parallel to a fourth core part 931 of the third magnetic core 930.

In addition, the first and second magnetic cores 910 and 920 are longer than the fourth core part 931 of the third magnetic core 930.

Thus, the right side of the first magnetic core 910 may face the fifth core part 932 and the left side of the seventh core part 934 of the third magnetic core 930. In addition, the left side of the second magnetic core 920 may face the sixth core part 933 and the right side of the eighth core part 935 of the third magnetic core 930.

Therefore, the fifth air gap 960 may be formed among the right side of the first magnetic core 910, the fifth core part 932 and the left side of the seventh core part 934 of the third magnetic core 930. In addition, sixth air gap 970 may be formed among the left side of the second magnetic core 920, the sixth core part 933 and the right side of the eighth core part 935 of the third magnetic core 930.

The first coil 940 is wound around the first magnetic core 910 and the second coil 950 is wound around the second magnetic core 920.

At this time, the first coil 940 may be wound lengthwise along the first magnetic core 910. In addition, the second coil 950 may be wound lengthwise along the second magnetic core 920.

Figure 9B:
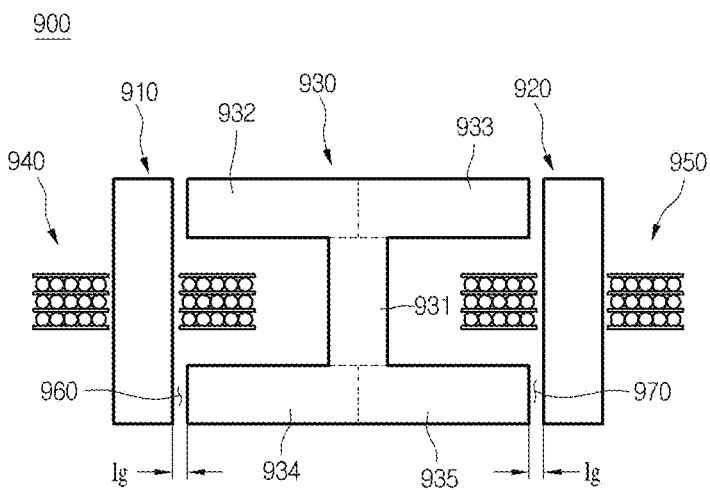

Meanwhile, as shown in FIG. 9b, the first coil 940 may be wound around the first magnetic core 910 in the direction crossing the length direction of the first magnetic core 910. In the same manner, the second coil 950 can be wound around the second magnetic core 920 in the direction crossing the length direction of the second magnetic core 920.

Figure 9C:
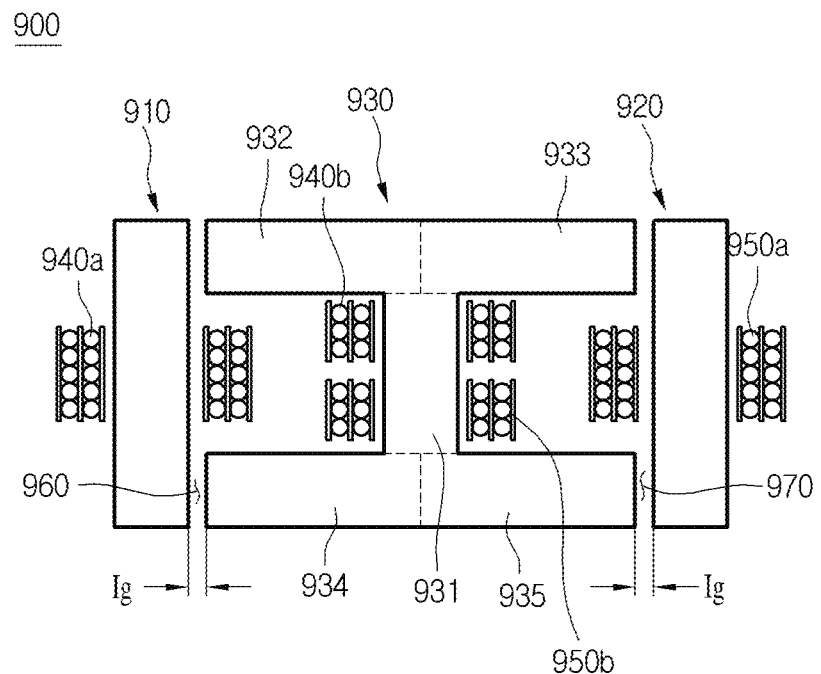

Further, as shown in FIG. 9c, the first coil 940 may include a primary coil 940a wound around the first magnetic core 910 and a secondary coil 940b wound around the fourth core part 931 of the third magnetic core 230 while being connected to the primary coil 940a in series.

In addition, the second coil 950 may include a tertiary coil 950a wound around the second magnetic core 920 and a quaternary coil 950b wound around the third magnetic core 230 while being connected to the tertiary coil 950a in series.

Figure 10A:
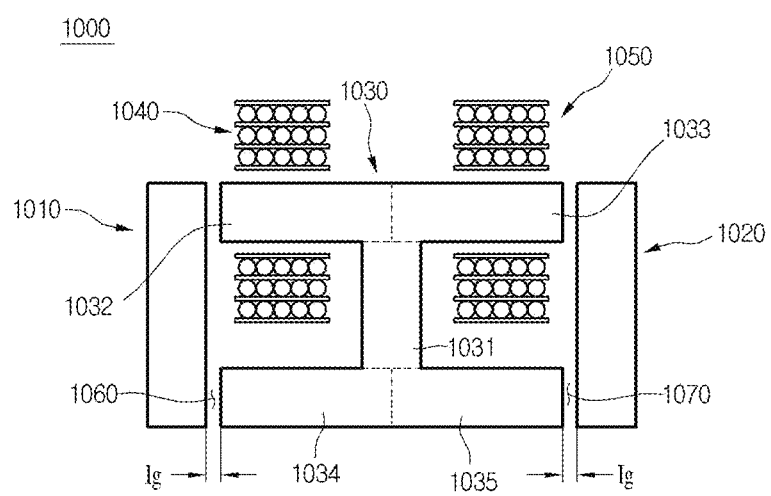

FIG. 10a is a view showing a couple inductor according to the ninth embodiment.

Referring to FIG. 10a, the couple inductor 1000 includes a first magnetic core 1010, a second magnetic core 1020, a third magnetic core 1030, a fifth air gap 1060 and a sixth air gap 1070, which are similar to those of the couple inductor 900 according to the eighth embodiment.

According to the eighth embodiment, the first coil 940 is wound around the first magnetic core 910 and the second coil 950 is wound around the second magnetic core 920. However, according to the ninth embodiment, first and second coils 1040 and 1050 are wound around the third magnetic core 1030.

In detail, the first coil 1040 is wound around a fifth coil part 1032 of the third magnetic core 1030 and the second coil 1050 is wound around a sixth coil part 1033 of the third magnetic core 1030.

Figure 10B:
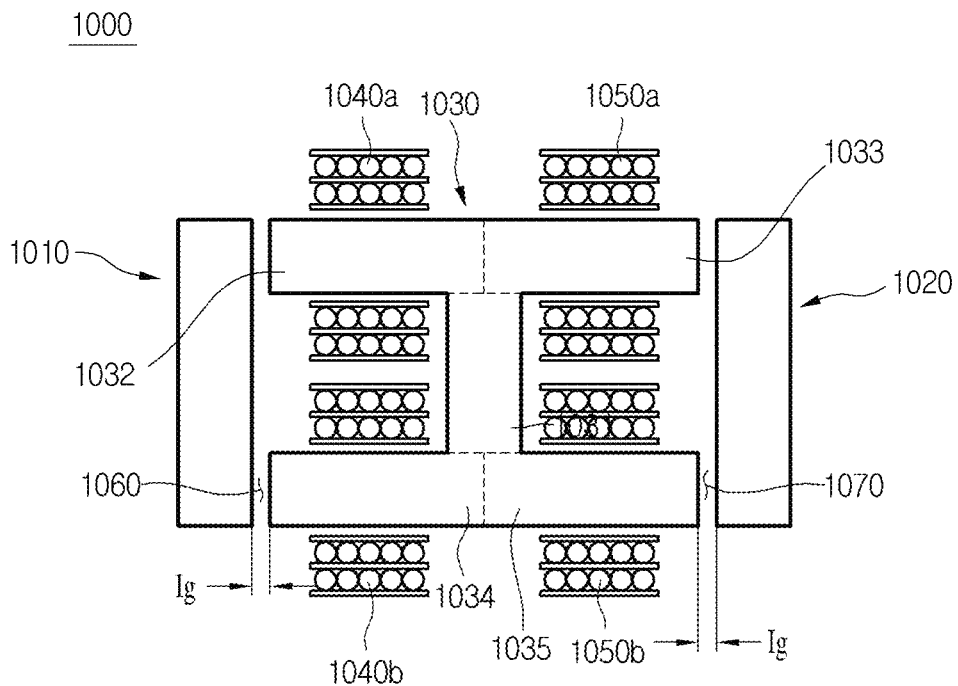

Meanwhile, as shown in FIG. 10b, the first coil 1040 may include a primary coil 1040a wound around a fifth core part 1032 of the third magnetic core 1030 and a secondary coil 1040b wound around a seventh core part 1034 of the third magnetic core 1030 while being connected to the primary coil 1040a in series.

In addition, the second coil 1050 may include a tertiary coil 1050a wound around a sixth coil part 1033 of the third magnetic core 1030 and a quaternary coil 1050b wound around an eighth core part 1035 of the third magnetic core 230 while being connected to the tertiary coil 1050a in series.

Figure 11:
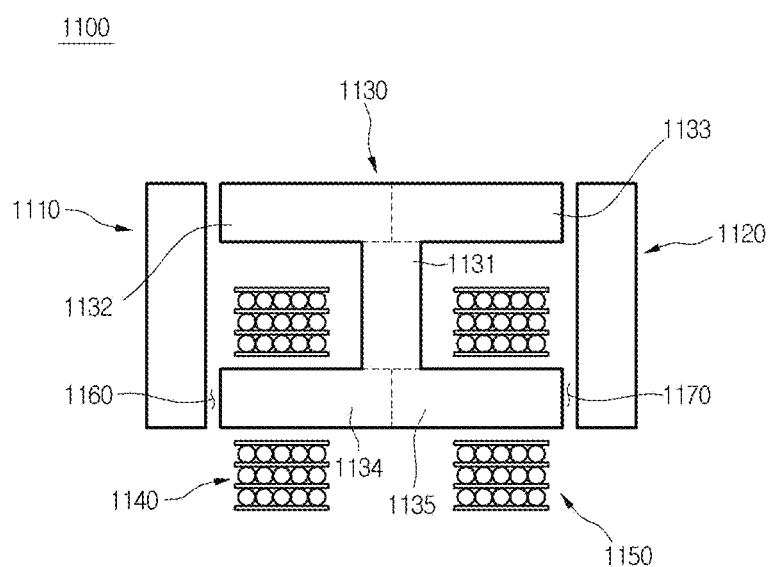

FIG. 11 is a view showing a couple inductor according to the tenth embodiment.

Referring to FIG. 11, the couple inductor 1100 includes a first magnetic core 1110, a second magnetic core 1120, a third magnetic core 1130, a fifth air gap 1160 and a sixth air gap 1170, which are similar to those of the couple inductors 900 and 1000 according to the eighth and ninth embodiments.

According to the eighth embodiment, the first coil 940 is wound around the first magnetic core 910 and the second coil 950 is wound around the second magnetic core 920. However, according to the tenth embodiment, first and second coils 1140 and 1150 are wound around the third magnetic core 1130.

In detail, the first coil 1140 is wound around a seventh coil part 1134 of the third magnetic core 1130 and the second coil 1150 is wound around an eighth coil part 1135 of the third magnetic core 1130.

Figure 12:
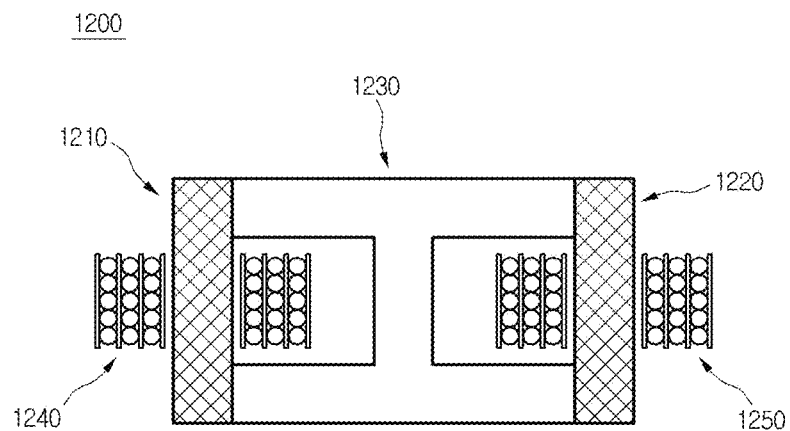

FIG. 12 is a view showing a couple inductor 1200 according to the eleventh embodiment.

Referring to FIG. 12, the couple inductor 1200 includes a first magnetic core 1210, a second magnetic core 1220, a third magnetic core 1230, a first coil 1240 and a second coil 1250, which are similar to those of the couple inductor 900 according to the eighth embodiment.

The fifth and sixth air gaps 960 and 970 are included in the eighth embodiment, but the couple inductor 1200 according to the eleventh embodiment may not include an air gap.

Thus, the first magnetic core 1210 makes contact with the third magnetic core 1230 and the second magnetic core 1220 makes contact with the third magnetic core 1230.

In addition, the first and second cores 1210 and 1220 are formed by using the same magnetic material and the third magnetic core 1230 is formed by using the magnetic material different from the magnetic material for the first and second magnetic cores 1210 and 1220.

That is, the first and second magnetic cores 1210 and 1220 may include powder cores having low permeability and the third magnetic core 1230 may include a ferrite core having high permeability.

In other words, the air gap is not formed in the couple inductor and the magnetic cores are prepared by using different magnetic materials, so the eddy current losses generated from the first and second coils 1240 and 1250 caused by the fringing flux can be reduced. In addition, since the couple inductor is fabricated without the air gap, the additional process, such as the cutting process, may be omitted.

Figure 13:
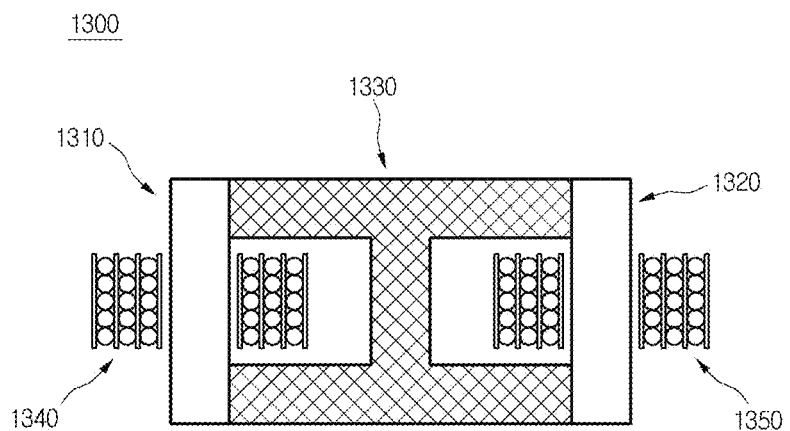

FIG. 13 is a view showing a couple inductor according to the twelfth embodiment.

Referring to FIG. 13, the couple inductor 1300 includes a first magnetic core 1310, a second magnetic core 1320, a third magnetic core 1330, a first coil 1340 and a second coil 1350, which have the shapes identical to those of the couple inductor 1200 according to the eleventh embodiment.

Although the first and second magnetic cores 1210 and 1220 according to the eleventh embodiment have the magnetic property of low permeability, the first and second magnetic cores 1310 and 1320 according to the twelfth embodiment have the magnetic property of high permeability.

Therefore, contrary to the eleventh embodiment, the third magnetic core 1330 has the magnetic property of low permeability different from the first and second magnetic cores 1310 and 1320.

Figure 14:
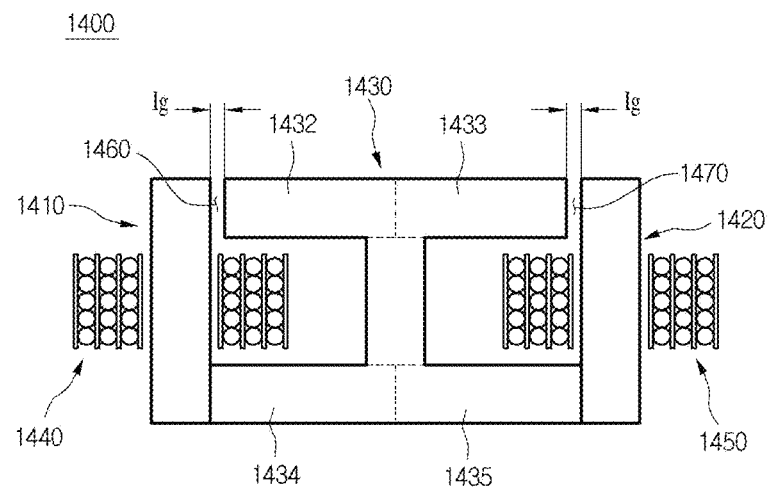

FIG. 14 is a view showing a couple inductor according to the thirteenth embodiment.

Referring to FIG. 14, the couple inductor 1400 includes a first magnetic core 1410, a second magnetic core 1420, a third magnetic core 1430, a first coil 1440 and a second coil 1450, which have the shapes identical to those of the couple inductor 900 according to the eighth embodiment.

According to the eighth embodiment, a plurality of fifth air gaps 960 are formed between the first and third magnetic cores 910 and 930 and a plurality of sixth air gaps 970 are formed between the second and third magnetic cores 920 and 930 due to the structures of the first to third magnetic cores 910, 920 and 930.

However, according to the thirteenth embodiment, one fifth air gap 1460 is formed between the first and third magnetic cores 1410 and 1430 and one sixth air gap 1470 is formed between the second and third magnetic cores 1420 and 1430.

To this end, one end of a fifth core part 1432 of the third magnetic core 1430 is cut such that the third magnetic core 1430 can be spaced apart from the first magnetic core 1410, thereby forming the fifth air gap 1460. In addition, one end of a sixth core part 1433 of the third magnetic core 1430 is cut such that the third magnetic core 1430 can be spaced apart from the second magnetic core 1420, thereby forming the sixth air gap 1470.

At this time, since only one air gap is formed between the first and third magnetic cores 1410 and 1430 of the couple inductor 1400 and only one air gap is formed between the second and third magnetic cores 1420 and 1430 of the couple inductor 1400, the width of the fifth and sixth air gaps 1460 and 1470 is wider than the width of the fifth and sixth air gaps 960 and 970 according to the eighth embodiment.

Thus, in the couple inductor 1400, a fifth core part 1432 of the third magnetic core 1430 is longer than a fifth core part 1434 and an eighth core part 1435 of the third magnetic core 1430 is longer than a sixth core part 1433.

In addition, the first coil 1440 may be wound around the first magnetic core 1410 and the second coil 1450 may be wound around the second magnetic core 1420.

Figure 15:
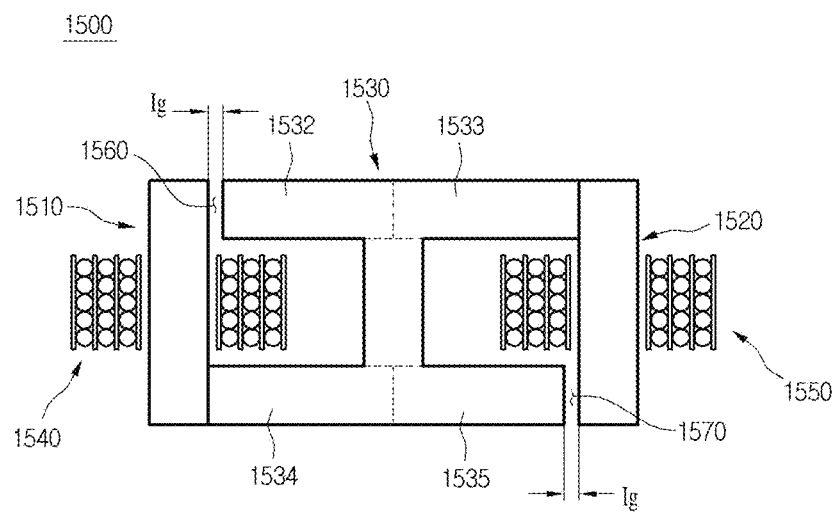

FIG. 15 is a view showing a couple inductor according to the fourteenth embodiment.

Referring to FIG. 15, the couple inductor 1500 includes a first magnetic core 1510, a second magnetic core 1520, a third magnetic core 1530, a first coil 1540 and a second coil 1550, which have the shapes identical to those of the couple inductor 1400 according to the thirteenth embodiment.

According to the couple inductor 1400 of the thirteenth embodiment, the sixth air gap 1470 is formed between the sixth core part 1433 of the third magnetic core 1430 and the second magnetic core 1420. However, according to the couple inductor 1500 of the fourteenth embodiment, a sixth air gap 1570 is formed between an eighth core part 1535 of the third magnetic core 1530 and the second magnetic core.

In other words, according to the couple inductor 1400 of the thirteenth embodiment, the fifth and sixth air gaps 1460 and 1470 are formed at the top surface of the couple inductor 1400 together. However, according to the couple inductor 1500 of the fourteenth embodiment, fifth and sixth air gaps 1560 and 1570 are separately formed at the top and bottom surfaces of the couple inductor 1500, respectively.

Thus, a sixth core part 1533 of the third magnetic core 1530 is longer than an eighth core part 1535 of the third magnetic core 1530 in the couple inductor 1500 according to the fourteenth embodiment.

Figure 16:
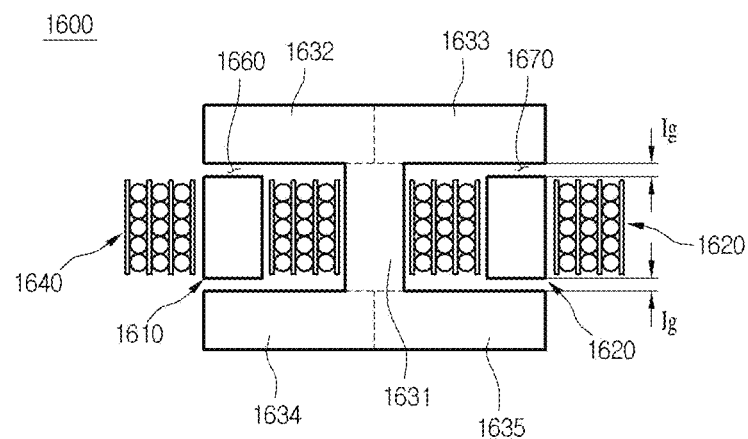

FIG. 16 is a view showing a couple inductor according to the fifteenth embodiment.

Referring to FIG. 16, the couple inductor 1600 includes a first magnetic core 1610, a second magnetic core 2620, a third magnetic core 2630, a first coil 1640, a second coil 1650, a fifth air gap 1660 and a sixth air gap 1670, which are similar to those of the couple inductor 900 according to the eighth embodiment.

The first and second magnetic cores 1610 and 1620 may have the same shape of 'I'.

The third magnetic core 1630 is formed between the first and second magnetic cores 1610 and 1620. The third magnetic core 1630 has a shape of 'H', which is different from the shape of the first and second magnetic cores 1610 and 1620.

According to the fifteenth embodiment, different from the eighth embodiment, the first and second magnetic cores 1610 and 1620 may have the length the same as that of a fourth core part 1631 of the third magnetic core 1630.

Thus, the top surface of the first magnetic core 1610 faces the bottom surface of a fifth core part 1632 of the third magnetic core 1630, and the bottom surface of the first magnetic core 1610 faces the top surface of a seventh core part 1634 of the third magnetic core 1630. In addition, the top surface of the second magnetic core 1620 faces the bottom surface of a sixth core part 1633 of the third magnetic core 1630, and the bottom surface of the second magnetic core 1620 faces the top surface of an eighth core part 1635 of the third magnetic core 1630.

As a result, one fifth air gap 1660 is formed between the top surface of the first magnetic core 1610 and the bottom surface of the fifth core part 1632 of the third magnetic core 1630, and another fifth air gap 1660 is formed between the bottom surface of the first magnetic core 1610 and the top surface of the seventh core part 1634 of the third magnetic core 1630. In addition, one sixth air gap 1670 is formed between the top surface of the second magnetic core 1620 and the bottom surface of the sixth core part 1633 of the third magnetic core 1630, and another sixth air gap 1670 is formed between the bottom surface of the second magnetic core 1620 and the top surface of the eighth core part 1635 of the third magnetic core 1630.

The first coil 1640 is wound around the first magnetic core 1610 and the second coil 1650 is wound around the second magnetic core 1620.

Figure 17:
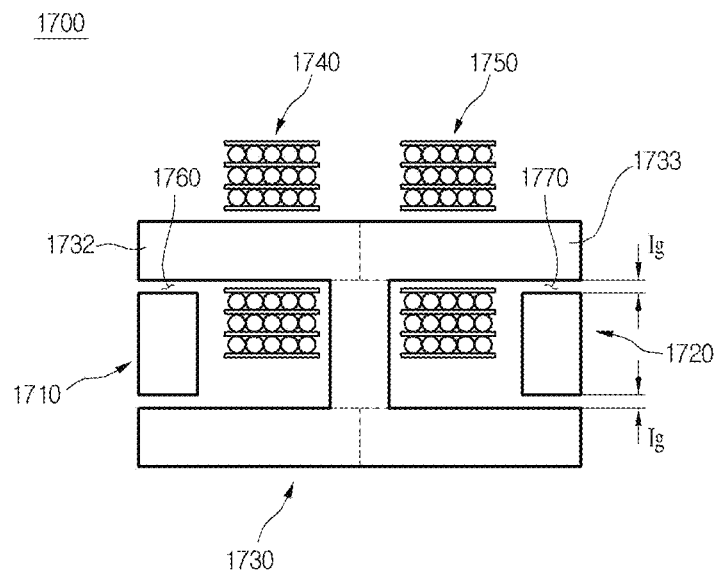

FIG. 17 is a view showing a couple inductor according to the sixteenth embodiment.

Referring to FIG. 17, the couple inductor 1700 includes a first magnetic core 1710, a second magnetic core 1720, a third magnetic core 1730, a fifth air gap 1760 and a sixth air gap 1770, which are similar to those of the couple inductor 1600 according to the fifteenth embodiment.

First and second coils 1740 and 1750 are wound around the third magnetic core 1730.

In detail, the first coil 1740 is wound around a fifth core part 1732 of the third magnetic core 1730 and the second coil 1750 is wound around a sixth core part 1733 of the third magnetic core 1730.

Figure 18:
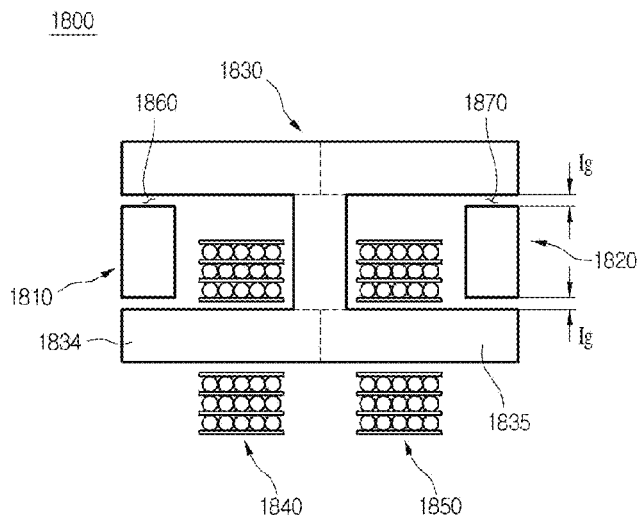

FIG. 18 is a view showing a couple inductor according to the seventeenth embodiment.

Referring to FIG. 18, the couple inductor 1800 includes a first magnetic core 1810, a second magnetic core 1820, a third magnetic core 1830, a fifth air gap 1860 and a sixth air gap 1870, which are similar to those of the couple inductor 1600 according to the fifteenth embodiment.

At this time, the first coil 1840 is wound around a seventh core part 1834 of the third magnetic core 1830 and the second coil 1850 is wound around an eighth core part 1835 of the third magnetic core 1830.

Figure 19:
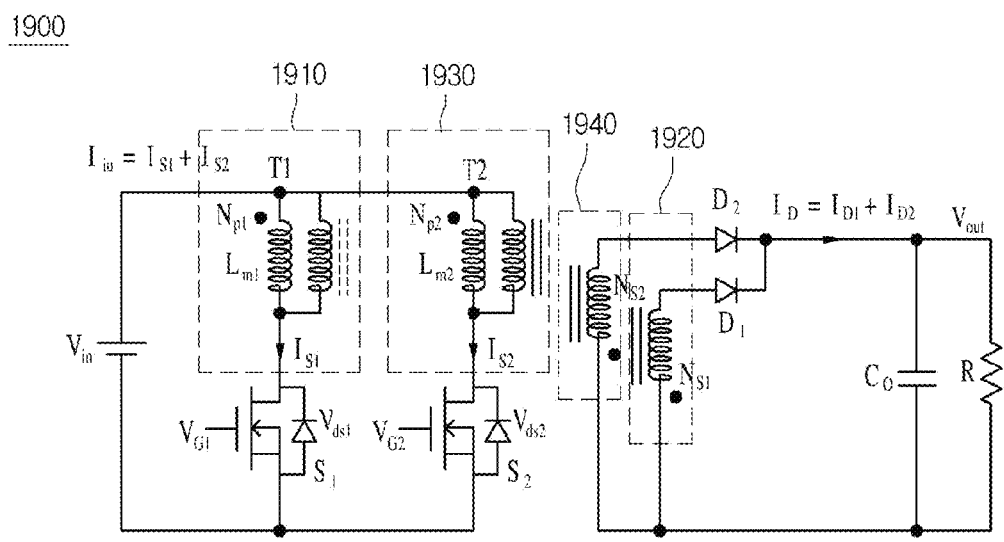
FIG. 19 is a view showing a power supply apparatus including a couple transformer according to the embodiment.

FIG. 19 is a view showing a power supply apparatus according to the embodiment.

Referring to FIG. 19, the power supply apparatus 1900 includes a first transformer and a second transformer.

The first transformer includes a primary coil part 1910 and a secondary coil part 1920. In addition, the second transformer also includes a primary coil part 1930 and a secondary coil part 1940. In this case, the primary coil parts 1910 and 1930 may include a plurality of coils.

Hereinafter, the structure of a couple transformer including the first and second transformers will be described.

The structure of the couple transformer may be identical to the structure of the couple inductor described above. However, although the first and second coils are wound in the couple inductor, a plurality of primary coils and one secondary coil are wound instead of the first coil and a plurality of primary coils and one secondary coil are wound instead of the second coil in the couple transformer.

Therefore, the structure of the couple transformer according to one exemplary embodiment from among various embodiments will be described below and the structure of the couple inductor, which may be omitted in the description for the structure of the couple transformer, will be applicable for the structure of the couple transformer.

Figure 20A:
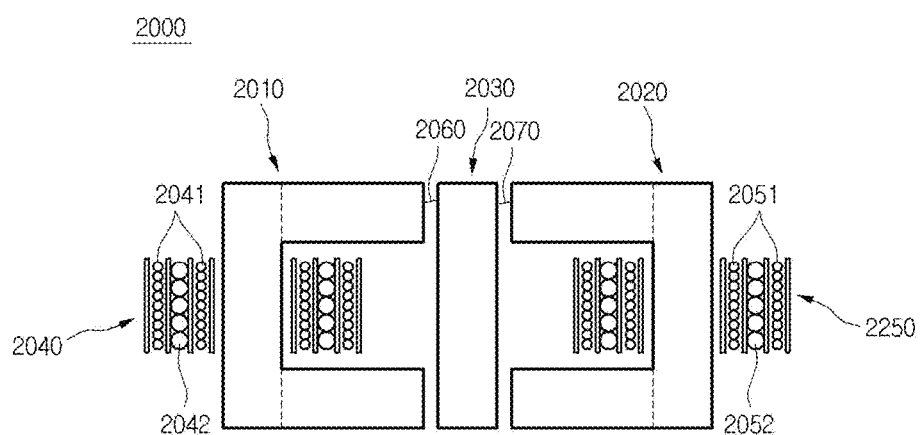
FIGS. 20 to 23 are views showing a couple transformer according to the embodiment.

FIG. 20a is a view showing a couple transformer according to the first embodiment.

Referring to FIG. 20a, the couple transformer 2000 includes a first magnetic core 2010, a second magnetic core 2020, a third magnetic core 2030, a first air gap 2060, and a second air gap 2070, which are identical to those of the couple inductor 200 shown in FIG. 2.

However, although the inductor coils 240 and 250 are wound around the first and second magnetic cores 210 and 220 in the couple inductor 200, transformer coils 2040 and 2050 are wound around the first and second magnetic cores 2010 and 2020 in the couple transformer 2000.

In detail, the first transformer coil 2040 including primary and secondary coils 2041 and 2042 is wound around the first magnetic core 2010, and the second transformer coil 2050 including primary and secondary coils 2051 and 2052 is wound around the second magnetic core 2020.

At this time, the first transformer coil 2040 can be wound lengthwise along the first magnetic core 2010. In the same manner, the second transformer coil 2050 can be wound lengthwise along the second magnetic core 2020.

Figure 20B:
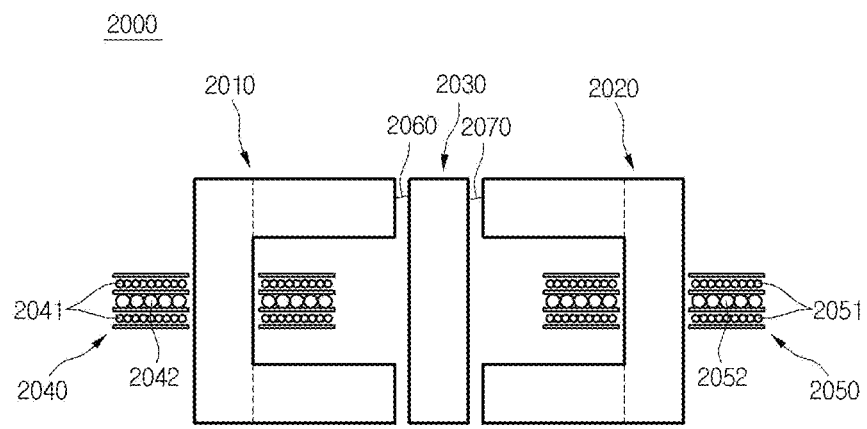

Meanwhile as shown in FIG. 20b, the first transformer coil 2040 may be wound around the first magnetic core 2010 in the direction crossing the length direction of the first magnetic core 2010. In the same manner, the second transformer coil 2050 may be wound around the second magnetic core 2020 in the direction crossing the length direction of the second magnetic core 2020.

Figure 21A:
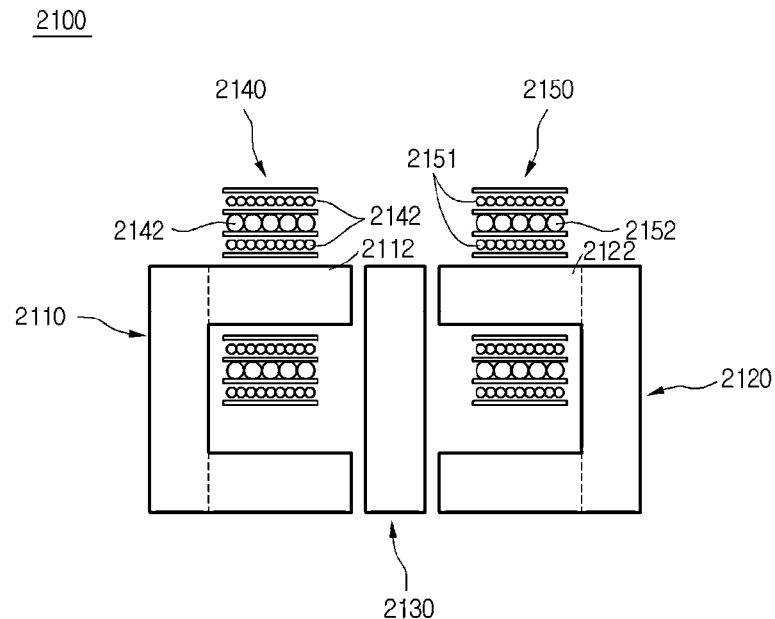

FIG. 21a is a view showing a couple transformer according to the second embodiment.

Referring to FIG. 21a, the couple transformer 2100 includes a first magnetic core 2110, a second magnetic core 2120, a third magnetic core 2130, a first air gap 2160, and a second air gap 2170, which are identical to those of the couple transformer 2000 shown in FIG. 20a.

A first transformer coil 2140 is wound around a second core part 2112 located at an upper portion of the first magnetic core 2110, and a second transformer coil 2150 is wound around a second core part 2122 located at an upper portion of the second magnetic core 2120.

Figure 21B:
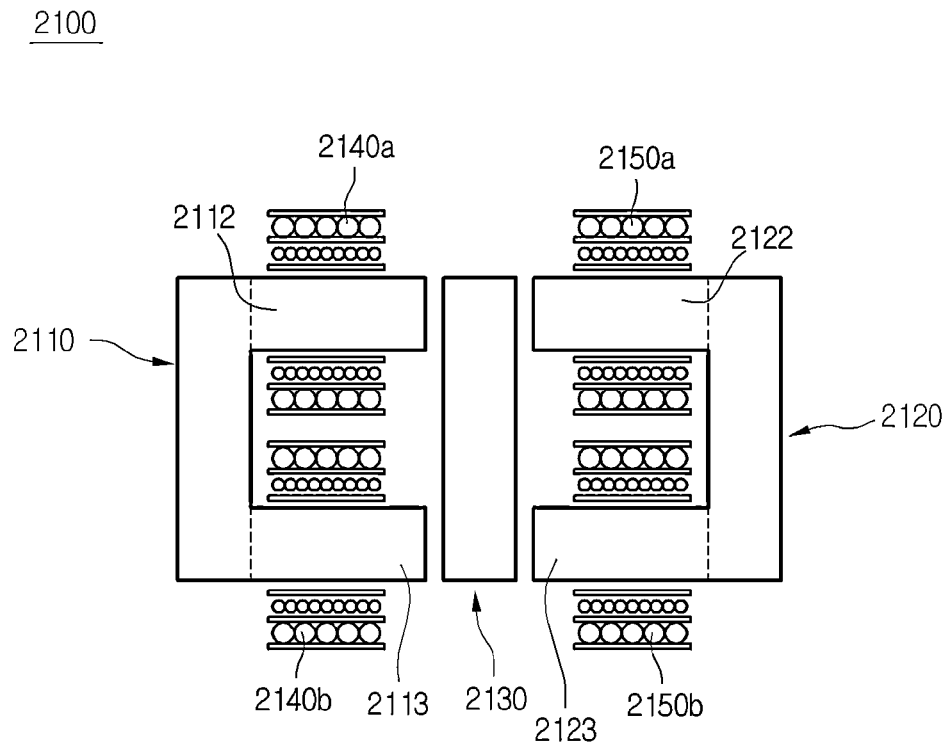

Meanwhile, as shown in FIG. 21b, the first transformer coil 2140 may include a primary transformer coil 2140a wound around the second core part 2112 of the first magnetic core 2110 and a secondary transformer coil 2140b wound around a third core part 2113 of the first magnetic core 2110 and connected to the primary transformer coil 2140a in series.

In the same manner, the second transformer coil 2150 may include a tertiary transformer coil 2150a wound around the second core part 2122 of the second magnetic core 2120 and a quaternary transformer coil 2150b wound around a third core part 2123 of the second magnetic core 2120 and connected to the tertiary transformer coil 2150a in series.

Figure 22A:
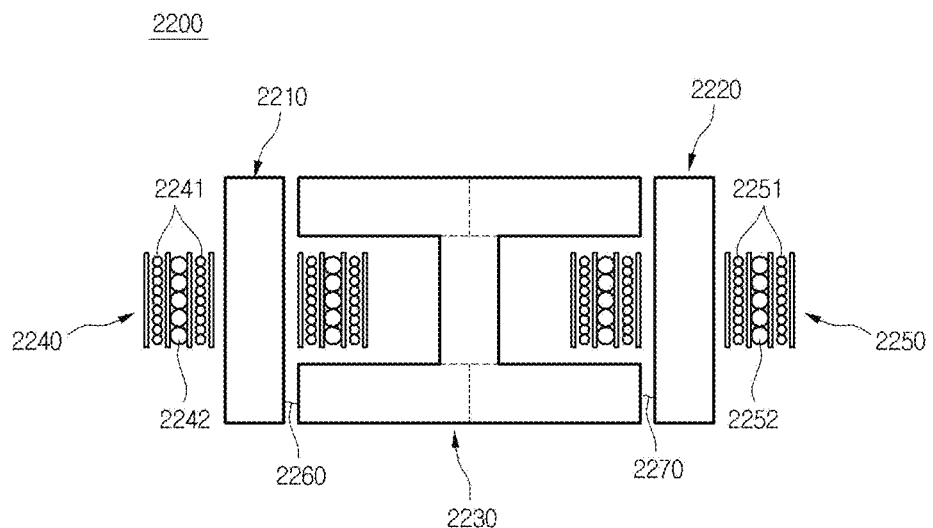

FIG. 22a is a view showing a couple transformer according to the third embodiment.

Referring to FIG. 22a, the couple transformer 2200 includes a first magnetic core 2210, a second magnetic core 2220, a third magnetic core 2230, a fifth air gap 2260, and a sixth air gap 2270, which are identical to those of the couple inductor 900 shown in FIG. 9a.

However, although the inductor coils 940 and 950 are wound around the first and second magnetic cores 910 and 920 in the couple inductor 900, transformer coils 2240 and 2250 are wound around the first and second magnetic cores 2210 and 2220 in the couple transformer 2200.

In detail, the first transformer coil 2240 including primary and secondary coils 2241 and 2242 is wound around the first magnetic core 2210, and the second transformer coil 2250 including primary and secondary coils 2251 and 2252 is wound around the second magnetic core 2220.

At this time, the first transformer coil 2240 can be wound lengthwise along the first magnetic core 2210. In the same manner, the second transformer coil 2250 can be wound lengthwise along the second magnetic core 2220.

Figure 22B:
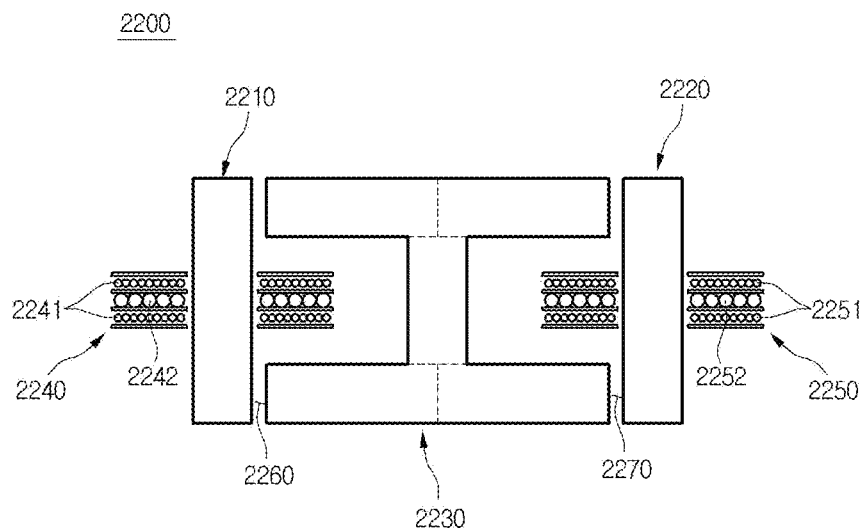

Meanwhile as shown in FIG. 22b, the first transformer coil 2240 may be wound around the first magnetic core 2210 in the direction crossing the length direction of the first magnetic core 2210. In the same manner, the second transformer coil 2250 may be wound around the second magnetic core 2220 in the direction crossing the length direction of the second magnetic core 2220.

Figure 23A:
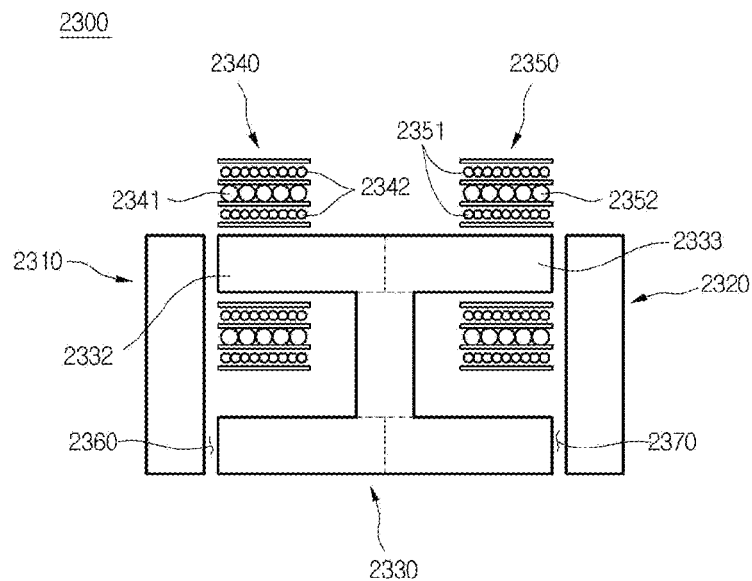

FIG. 23a is a view showing a couple transformer according to the fourth embodiment.

Referring to FIG. 23a, the couple transformer 2300 includes a first magnetic core 2310, a second magnetic core 2320, a third magnetic core 2330, a fifth air gap 2360, and a sixth air gap 2370, which are identical to those of the couple transformer 2200 according to the third embodiment.

Different from the third embodiment in which the first and second transformer coils 2240 and 2250 are wound around the first and second magnetic cores 2210 and 2220, respectively, the first and second transformer coils 2340 and 2350 are wound around the third magnetic core 2330 in the fourth embodiment.

In detail, the first transformer coil 2340 is wound around a fifth core part 2332 located at an upper left portion of the third magnetic core 2330 and the second transformer coil 2350 is wound around a sixth core part 2333 located at an upper right portion of the third magnetic core 2330.

Figure 23B:
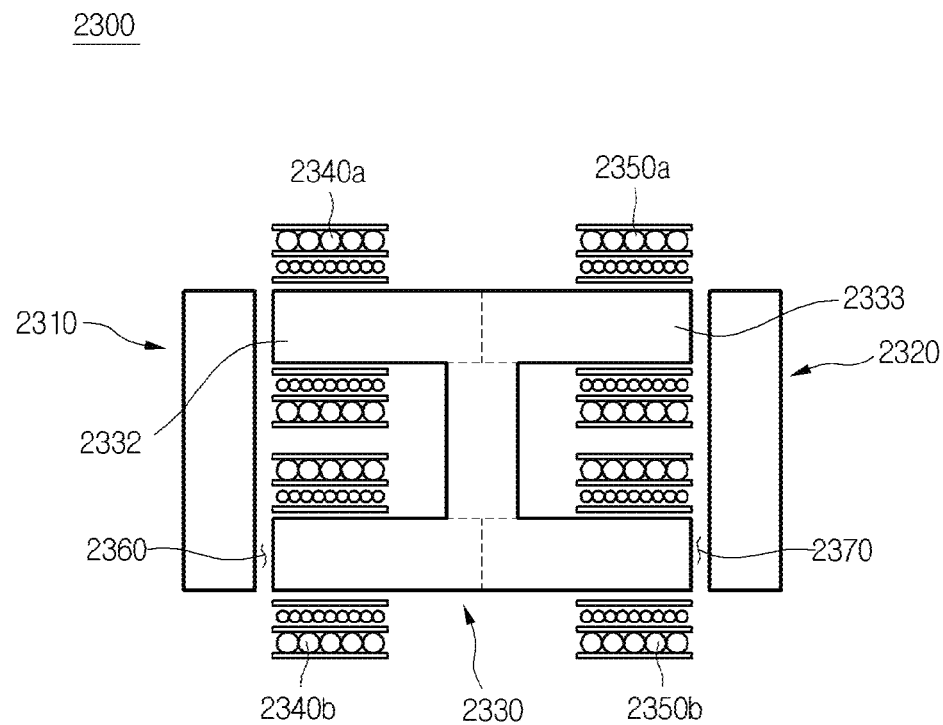

Meanwhile, as shown in FIG. 23b, the first transformer coil 2340 may include a primary transformer coil 2340a wound around the fifth core part 2332 of the third magnetic core 2330 and a secondary transformer coil 2340b wound around a seventh core part 2334 of the third magnetic core 2330 and connected to the primary transformer coil 2340a in series.

In the same manner, the second transformer coil 2350 may include a tertiary transformer coil 2350a wound around the sixth core part 2333 of the third magnetic core 2330 and a quaternary transformer coil 2350b wound around an eighth core part 2335 of the third magnetic core 2330 and connected to the tertiary transformer coil 2350a in series.

Figure 24:
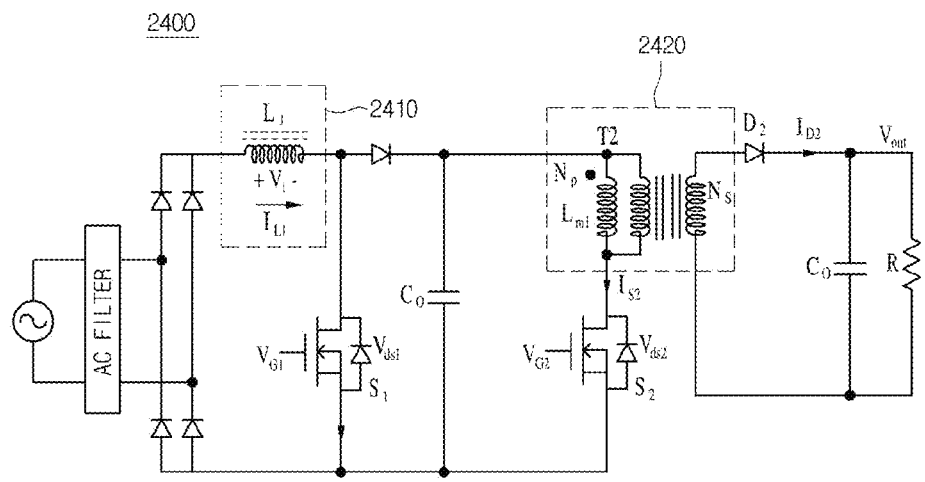
FIG. 24 is a view showing a power supply apparatus including a couple inductor-transformer according to the embodiment.

FIG. 24 is a view showing a power supply apparatus according to the embodiment.

Referring to FIG. 24, the power supply apparatus 2400 includes an inductor 2410 and a transformer 2420. The transformer 2420 includes primary and secondary coils.

Hereinafter, the structure of a couple inductor-transformer including the inductor 2410 and the transformer 2420 will be described.

The structure of the couple inductor-transformer may be identical to the structure of the couple inductor described above. However, although the first and second coils are wound in the couple inductor, a transformer coil including a plurality of primary coils and one secondary coil is wound instead of the second coil in the couple inductor-transformer.

In the following description, the structure and elements that have been described with reference to the couple inductor will be omitted in order to avoid redundancy.

Therefore, the structure of the couple inductor-transformer according to one exemplary embodiment from among various embodiments will be described below and the structure of the couple inductor, which may be omitted in the description for the structure of the couple inductor-transformer, will be applicable for the structure of the couple inductor-transformer.

Figure 25A:
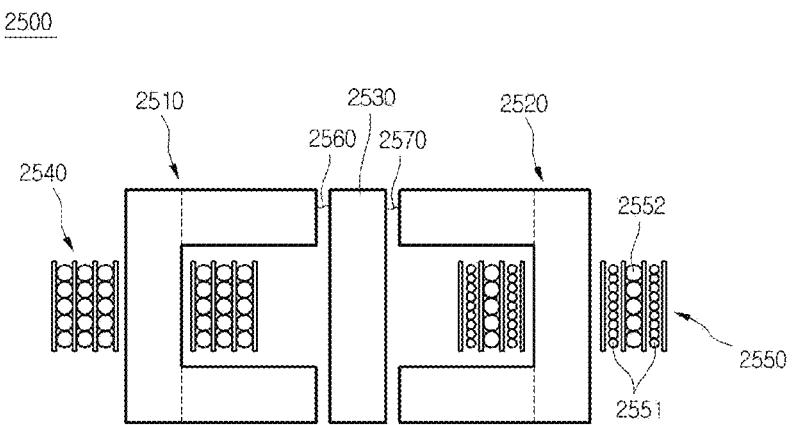
FIGS. 25 to 29 are views showing a power supply apparatus including a couple inductor-transformer according to the embodiment.

FIG. 25a is a view showing a couple inductor-transformer according to the first embodiment.

Referring to FIG. 25a, the couple inductor-transformer 2500 includes a first magnetic core 2510, a second magnetic core 2520, a third magnetic core 2530, a first air gap 2560, and a second air gap 2570, which are identical to those of the couple inductor 200 shown in FIG. 2.

However, although the inductor coils 240 and 250 are wound around the first and second magnetic cores 210 and 220 in the couple inductor 200, a transformer coil 2550 is wound around the second magnetic core 2520 in the couple inductor-transformer 2500.

In detail, an inductor coil 2540 is wound around the first magnetic core 2510 and a transformer coil 2550 including primary and secondary coils 2551 and 2552 is wound around the second magnetic core 2520.

At this time, the inductor coil 2540 can be wound lengthwise along the first magnetic core 2510. In the same manner, the transformer coil 2550 can be wound lengthwise along the second magnetic core 2520.

Figure 25B:
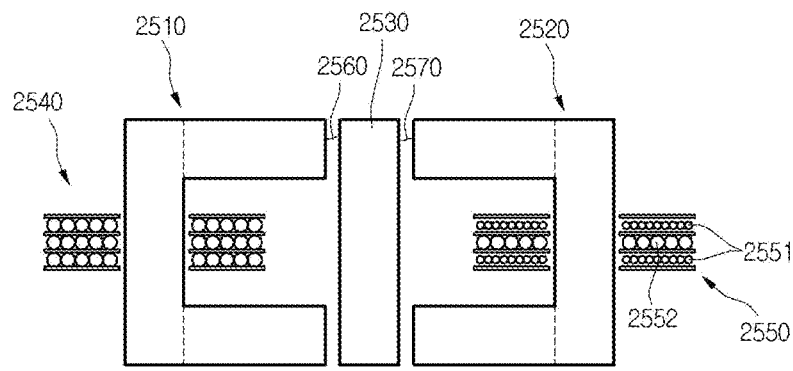

Meanwhile as shown in FIG. 25b, the inductor coil 2540 may be wound around the first magnetic core 2510 in the direction crossing the length direction of the first magnetic core 2510. In the same manner, the transformer coil 2550 may be wound around the second magnetic core 2520 in the direction crossing the length direction of the second magnetic core 2520.

Figure 26:
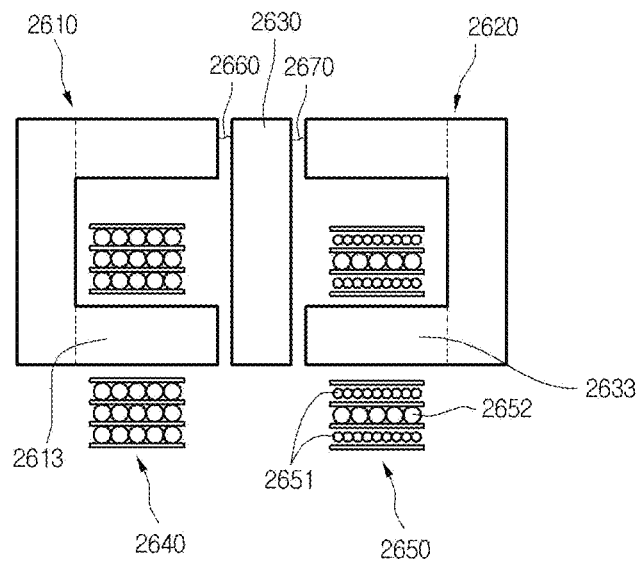

FIG. 26 is a view showing a couple inductor-transformer according to the second embodiment.

Referring to FIG. 26, the couple inductor-transformer 2600 includes a first magnetic core 2610, a second magnetic core 2620, a third magnetic core 2630, a first air gap 2660, and a second air gap 2670, which are identical to those of the couple inductor-transformer 2500 shown in FIG. 25.

An inductor coil 2640 is wound around a third core part 2613 located at a lower portion of the first magnetic core 2610, and a transformer coil 2650 is wound around a third core part 2633 located at a lower portion of the second magnetic core 2620.

Figure 27A:
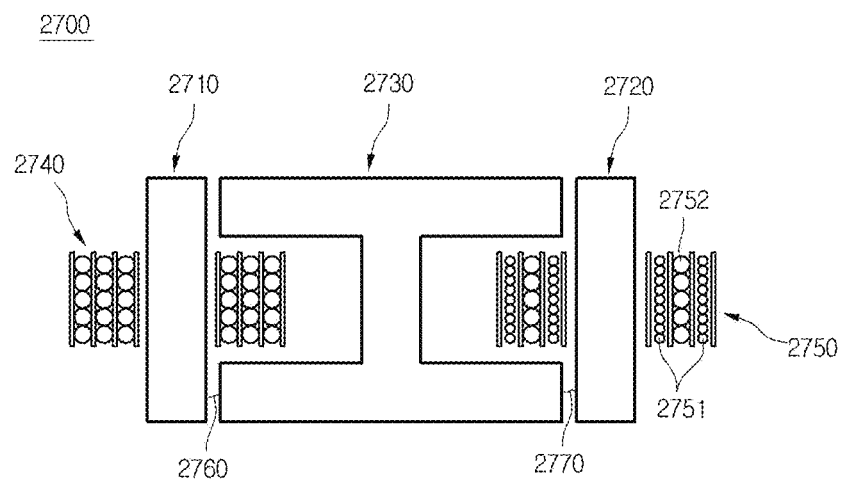

FIG. 27a is a view showing a couple inductor-transformer according to the third embodiment.

Referring to FIG. 27a, the couple inductor-transformer 2700 includes a first magnetic core 2710, a second magnetic core 2720, a third magnetic core 2730, a first air gap 2760, and a second air gap 2770, which are identical to those of the couple transformer 900 shown in FIG. 9a.

However, although the inductor coils 940 and 950 are wound around the first and second magnetic cores 910 and 920 in the couple inductor 900, an inductor coil 2740 is wound around the first magnetic core 2710 and a transformer coil 2750 is wound around the second magnetic core 2720 in the couple inductor-transformer 2700.

At this time, the inductor coil 2740 can be wound lengthwise along the first magnetic core 2710. In the same manner, the transformer coil 2750 can be wound lengthwise along the second magnetic core 2720.

Figure 27B:
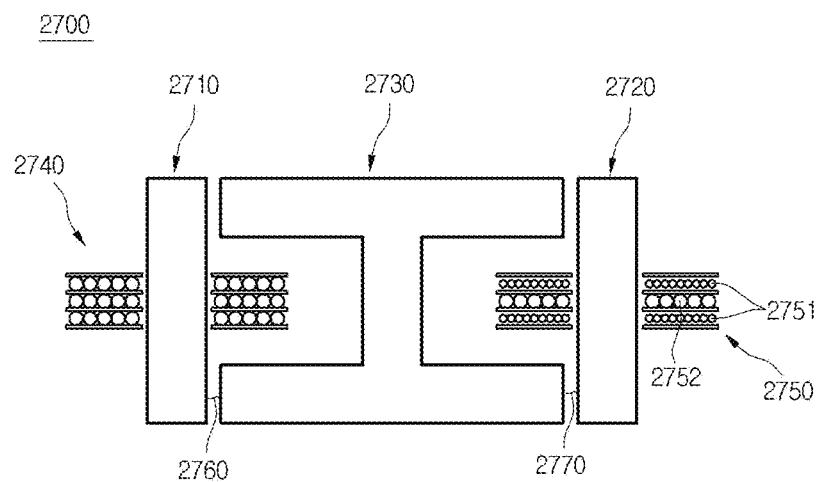

Meanwhile as shown in FIG. 27b, the inductor coil 2740 may be wound around the first magnetic core 2710 in the direction crossing the length direction of the first magnetic core 2710. In the same manner, the transformer coil 2750 may be wound around the second magnetic core 2720 in the direction crossing the length direction of the second magnetic core 2720.

Figure 28:
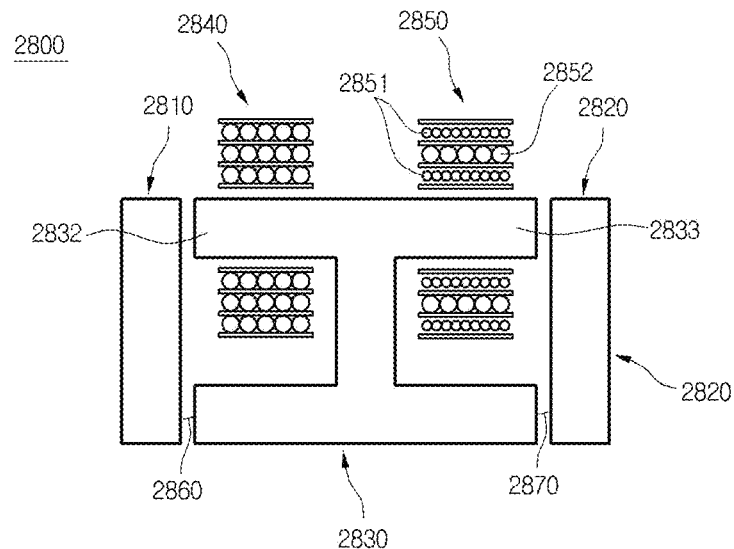

FIG. 28 is a view showing a couple inductor-transformer according to the fourth embodiment.

Referring to FIG. 28, the couple inductor-transformer 2800 includes a first magnetic core 2810, a second magnetic core 2820, a third magnetic core 2830, a fifth air gap 2860, and a sixth air gap 2870, which are identical to those of the couple inductor-transformer 2700 according to the third embodiment.

However, although the inductor coil 2740 and the transformer coil 2750 are wound around the first and second magnetic cores 2710 and 2720 in the third embodiment, an inductor coil 2840 and a transformer coil 2850 are wound around the third magnetic core 2830 in the fourth embodiment.

In detail, the inductor coil 2840 is wound around a fifth core part 2832 located at an upper left portion of the third magnetic core 2830 and the transformer coil 2850 is wound around a sixth core part 2833 located at an upper right portion of the third magnetic core 2830.

Figure 29:
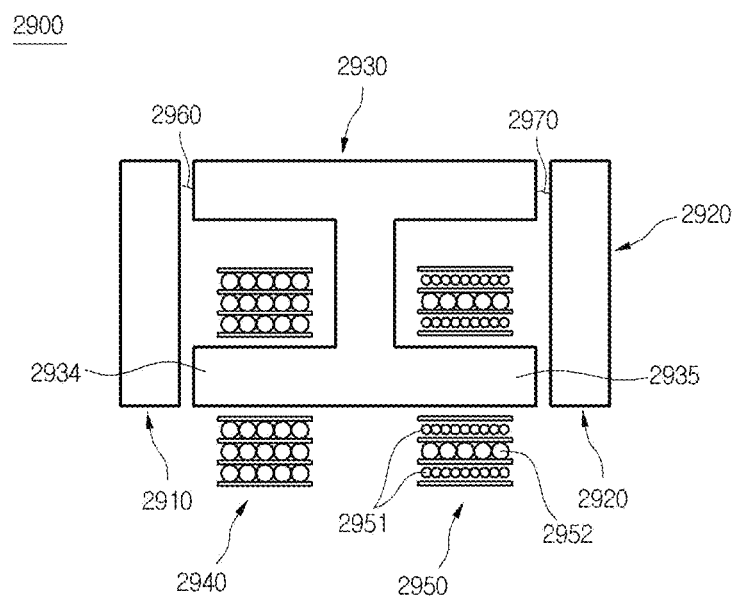

FIG. 29 is a view showing a couple inductor-transformer according to the fifth embodiment.

Referring to FIG. 29, the couple inductor-transformer 2900 includes a first magnetic core 2910, a second magnetic core 2920, a third magnetic core 2930, a fifth air gap 2960, and a sixth air gap 2970, which are identical to those of the couple inductor-transformer 2800 according to the fourth embodiment.

However, an inductor coil 2940 is wound around a seventh core part 2934 located at a lower left portion of the third magnetic core 2730, and a transformer coil 2950 is wound around an eighth core part 2935 located at a lower right portion of the third magnetic core 2930.

Figure 30:
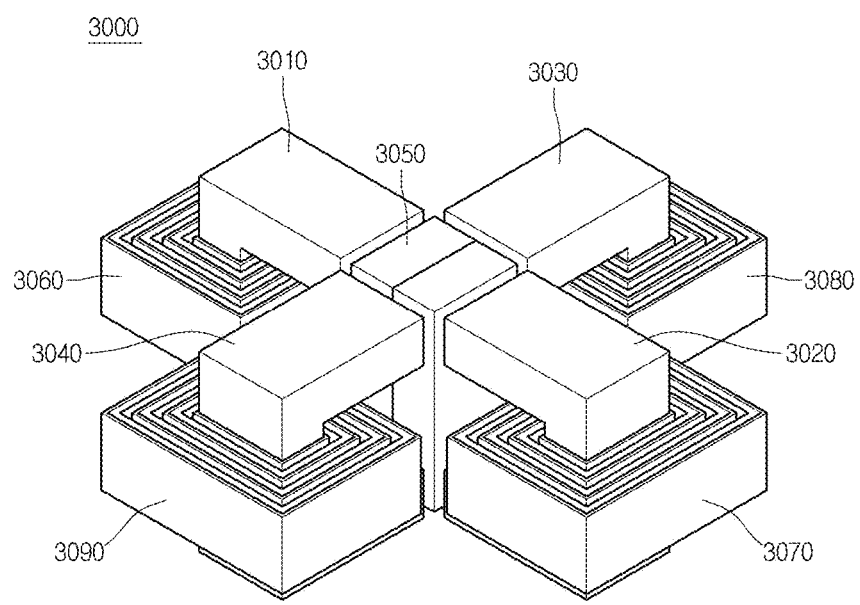
FIG. 30 is a view showing a couple inductor, a couple transformer and a couple inductor-transformer according to another embodiment.

FIG. 30 is a view showing a couple inductor, a couple transformer and a couple inductor-transformer according to another embodiment.

Referring to FIG. 30, each of the couple inductor, the couple transformer and the couple inductor-transformer may include a first magnetic core 3010, a second magnetic core 3020, a third magnetic core 3030, a fourth magnetic core 3040, a fifth magnetic core 3050, a first coil 3060 wound around the first magnetic core 3010, a second coil 3070 wound around the second magnetic core 3020, a third coil 3080 wound around the third magnetic coil 3030, and a fourth coil 3090 wound around the fourth magnetic coil 3040.

In this case, all of the first to fourth coils 3060, 3070, 3080 and 3090 may be inductor coils or transformer coils. Otherwise, the first and third coils 3060 and 3080 may be inductor coils and the second and fourth coils 3070 and 3090 may be transformer coils.

That is, in the couple inductor, the couple transformer and the couple inductor-transformer shown in the drawing, the magnetic cores are arranged in two directions (left and right directions about the central magnetic path) and coils are wound around the magnetic cores having the above configuration.

Otherwise, the magnetic cores may be arranged in the front and rear directions in addition to the left and right directions about the central magnetic path, so the embodiment can be applied to the 4-interleaved boost converter or 4-interleaved flyback converter where the cores are arranged in four directions and the coils are wound around the cores.

If the magnetic cores are arranged in four directions, the fifth magnetic core 3050 corresponding to the central magnetic path may have great loss because the fifth magnetic core 3050 has high magnetic flux variation. For this reason, the fifth magnetic core 3050 must have size twice larger than the other core.

Meanwhile, if the fifth magnetic core 3050 has the property of low permeability, the saturation magnetic flux density is high, so the fifth magnetic core 3050 having the sectional area of the magnetic path the same as that of the cores located at both sides of the fifth magnetic core 3050 can be employed. In detail, if the fifth magnetic core 3050 has the property of low permeability, the magnetic flux variation is low and the constant magnetic flux is achieved, so the core loss is reduced and the fringing flux is distributed due to the distribution of the air gaps, thereby minimizing copper loss caused by eddy current.

Figure 31:
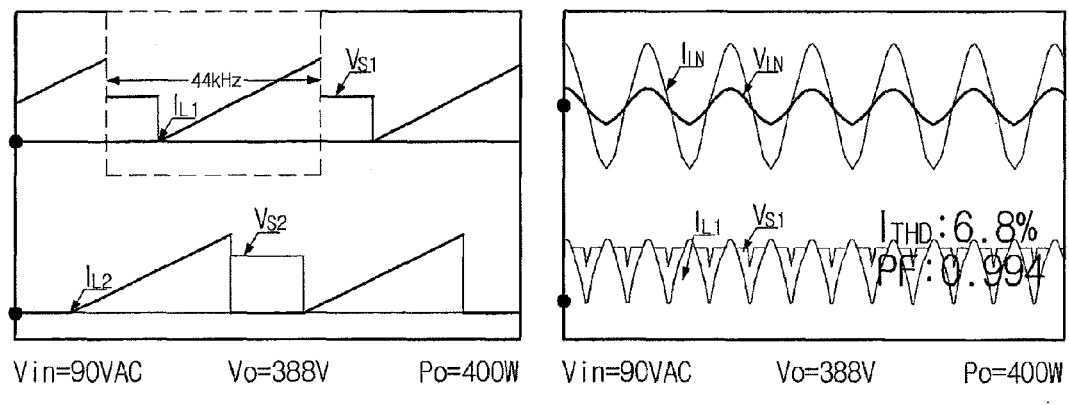
FIG. 31 is view showing an experimental result obtained by a couple inductor manufactured according to the embodiment.
Figure 31:
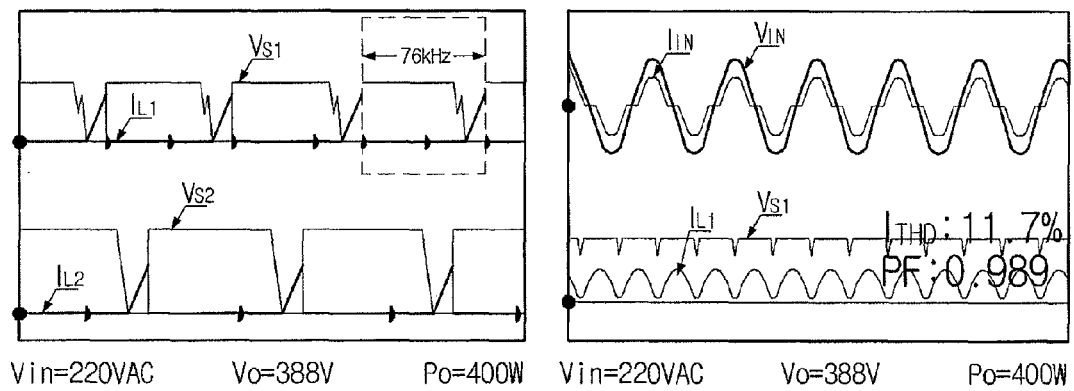

FIG. 31 is view showing an experimental result obtained by the couple inductor manufactured according to the embodiment.

The experiment was performed by using a control board capable of controlling an operation according to the control operation waveform and one couple inductor according to the embodiment under the conditions of 400 W of load, and 90 VAC and 220 VAC of commercial input voltage. Current waveforms Is1 and Is2, terminal voltage waveforms Vs1 and Vs2, input voltage Vac and current waveforms are shown in FIG. 31.

When taking the experimental result into consideration, the couple inductor according to the embodiment is applicable.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power supply apparatus comprising:
   a first magnetic core;
   a second magnetic core separated from the first magnetic core, having a shape symmetrical to a shape of the first magnetic core, and disposed symmetrically to the first magnetic core;
   a third magnetic core between a right side surface of the first magnetic core and a left side surface of the second magnetic core;
   a first coil wound around the first magnetic core; and
   a second coil wound around the second magnetic core,
   wherein the first and second magnetic cores are powder cores, and the third core is a ferrite core,
   wherein an upper surface of the first magnetic core and an upper surface of the second magnetic core lie in the same plane as an upper surface of the third magnetic core,
   wherein a right side surface of the first magnetic core is directly contacted with a left side surface of the third magnetic core,
   wherein a left side surface of the second magnetic core is directly contacted with a right side surface of the third magnetic core,
   wherein the first magnetic core has a shape of a 'U', and the second magnetic core is symmetrical to the first magnetic core about the third magnetic core,
   wherein each of the first and second magnetic cores comprises:
      a first core part;
      a second core part extending from one end of the first core part vertically to a length direction of the first core part; and
      a third core part extending from an opposite end of the first core part vertically to the length direction of the first core part,
   wherein the first coil is wound to the second core part of the first magnetic core; and
   wherein the second coil is wound to the second core part of the second magnetic core which is symmetrical to the second core part of the first magnetic core.

2. The power supply apparatus of claim 1, wherein the first and second coils are inductor coils, and
   the power supply apparatus includes a couple inductor.

3. The power supply apparatus of claim 1,
   wherein the third magnetic core is parallel to the first core parts of the first and second magnetic cores.

4. The power supply apparatus of claim 3,
   wherein the third magnetic core has a shape of 'I'.

5. The power supply apparatus of claim 1, wherein the material for the first magnetic core is same as the material for the second magnetic core.

6. The power supply apparatus of claim 3, wherein right side surfaces of the second and third core parts of the first magnetic core are directly contacted with the left side surface of the third magnetic core, and
   wherein left side surfaces of the second and third core parts of the second magnetic core are directly contacted with the right side surface of the third magnetic core.

* * * * *